(12) United States Patent
Wolf

(10) Patent No.: US 8,486,275 B2
(45) Date of Patent: Jul. 16, 2013

(54) SELF-CONTAINED PORTABLE MULTI-MODE WATER TREATMENT SYSTEM AND METHODS

(75) Inventor: Wayne Allan Wolf, Austin, TX (US)

(73) Assignee: Omni Water Solutions, Inc., Austin, TX (US)

( * ) Notice: Subject to any disclaimer, the term of this patent is extended or adjusted under 35 U.S.C. 154(b) by 525 days.

(21) Appl. No.: 12/780,837

(22) Filed: May 14, 2010

(65) Prior Publication Data

US 2010/0292844 A1  Nov. 18, 2010

Related U.S. Application Data

(60) Provisional application No. 61/216,165, filed on May 14, 2009.

(51) Int. Cl.
*G05B 19/00* (2006.01)
*C02F 9/08* (2006.01)
*C02F 9/12* (2006.01)

(52) U.S. Cl.
USPC ...... 210/748.19; 210/241; 210/259; 210/741; 210/746; 210/748.1; 210/748.11; 210/806

(58) Field of Classification Search
USPC .............. 210/241, 259, 806, 741, 746, 748.1, 210/748.11, 748.19
See application file for complete search history.

(56) References Cited

U.S. PATENT DOCUMENTS

| | | | |
|---|---|---|---|
| 4,871,452 A | 10/1989 | Kohler | |
| 5,106,495 A | 4/1992 | Hughes | |
| 5,512,178 A | 4/1996 | Dempo | |
| 5,547,584 A | 8/1996 | Capehart | |
| 5,741,416 A | 4/1998 | Tempest | |
| 5,785,864 A | 7/1998 | Teran | |
| 6,027,642 A | 2/2000 | Prince | |
| 6,090,294 A | 7/2000 | Teran | |
| 6,464,884 B1 | 10/2002 | Gadgil | |

(Continued)

FOREIGN PATENT DOCUMENTS

EP   1710210 A1   11/2006
WO   W02009143431 A1   11/2009

OTHER PUBLICATIONS

Biodisk Natural Purification of Wastewater, product brochure, Biodisk Corporation, Toronto, Ontario, publication No. 258, http://www.biodisk.ca/pdf/Portable_Plants.pdf.

(Continued)

*Primary Examiner* — Duane Smith
*Assistant Examiner* — Paul J Durand
(74) *Attorney, Agent, or Firm* — Robert L. Villhard

(57) ABSTRACT

An automated water treatment system and methods for treating raw water to produce potable water are disclosed. The system is a self-contained portable water treatment system having several selectable treatment subsystems and a controller which automatically selects and controls the mode of operation from a transient, normal or backwashing mode, automatically controls the flow of water through a treatment path based upon the selected mode of operation and the measured water quality characteristics of the water at selected locations, automatically determines, based upon the selected mode of operation and the water quality parameter measurements, which of the plurality of the selectable subsystems is needed to produce potable water at the output; and automatically direct the flow of water through a treatment path through the system to bypass the water treatment subsystems and elements that are not needed to produce potable water. The system is configured to fit inside a standard-sized commercial shipping container for transport and during operation.

20 Claims, 13 Drawing Sheets

U.S. PATENT DOCUMENTS

| | | |
|---|---|---|
| 6,824,695 B2 | 11/2004 | Tempest |
| 6,977,038 B2 | 12/2005 | Jowett |
| 7,311,817 B2 | 12/2007 | Palm |
| 7,459,077 B2 | 12/2008 | Staschik |
| 7,485,224 B2 | 2/2009 | Jones |
| 7,531,095 B2 | 5/2009 | Williamson |
| 7,632,410 B2 | 12/2009 | Heiss |
| 2002/0033363 A1 | 3/2002 | Hasegawa |
| 2003/0209477 A1 | 11/2003 | Lacasse |
| 2005/0139530 A1 | 6/2005 | Heiss |
| 2007/0199875 A1 | 8/2007 | Moorey |
| 2007/0214729 A1 | 9/2007 | Moore |
| 2009/0107917 A1 | 4/2009 | Capehart |

OTHER PUBLICATIONS

Siemens Mobile and Temporary Water Treatment Services, product description, Siemens AG 2010, http://www.water.siemens.com/en/services/mobileandtemporary/Pages/default.aspx.

Operators manual water purification unit, reverse osmosis, 600 GPH trailer mounted U.S. Army. ROWPUmanual.pdf ROWPU is a mobile water purifying unit needing a 30 KW power source that supplies drinking water for troops in the field.

International Search Report and Written Opinion dated Aug. 16, 2010, Application No. PCT/US2010/035036, 13 pages.

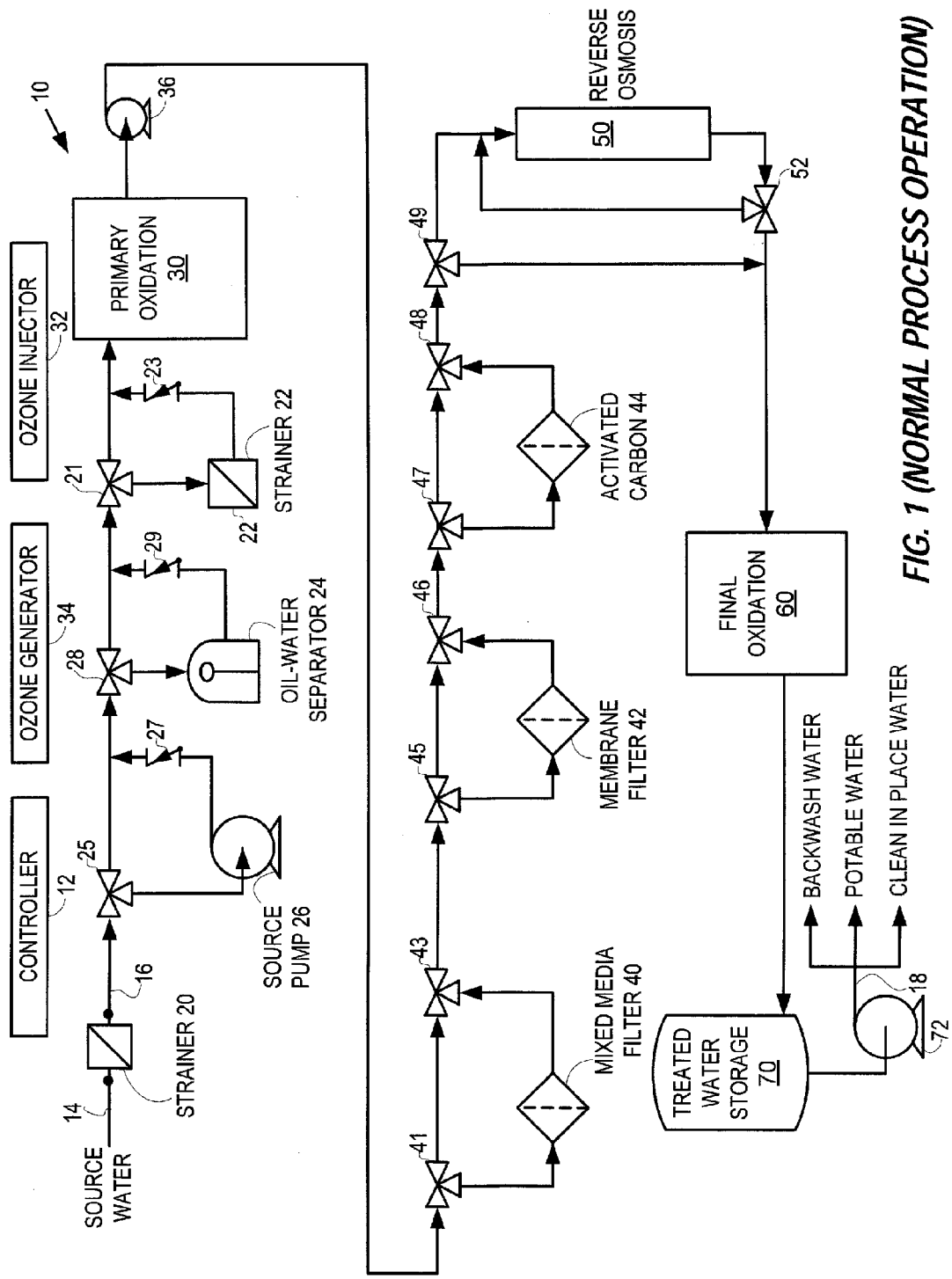
FIG. 1 (NORMAL PROCESS OPERATION)

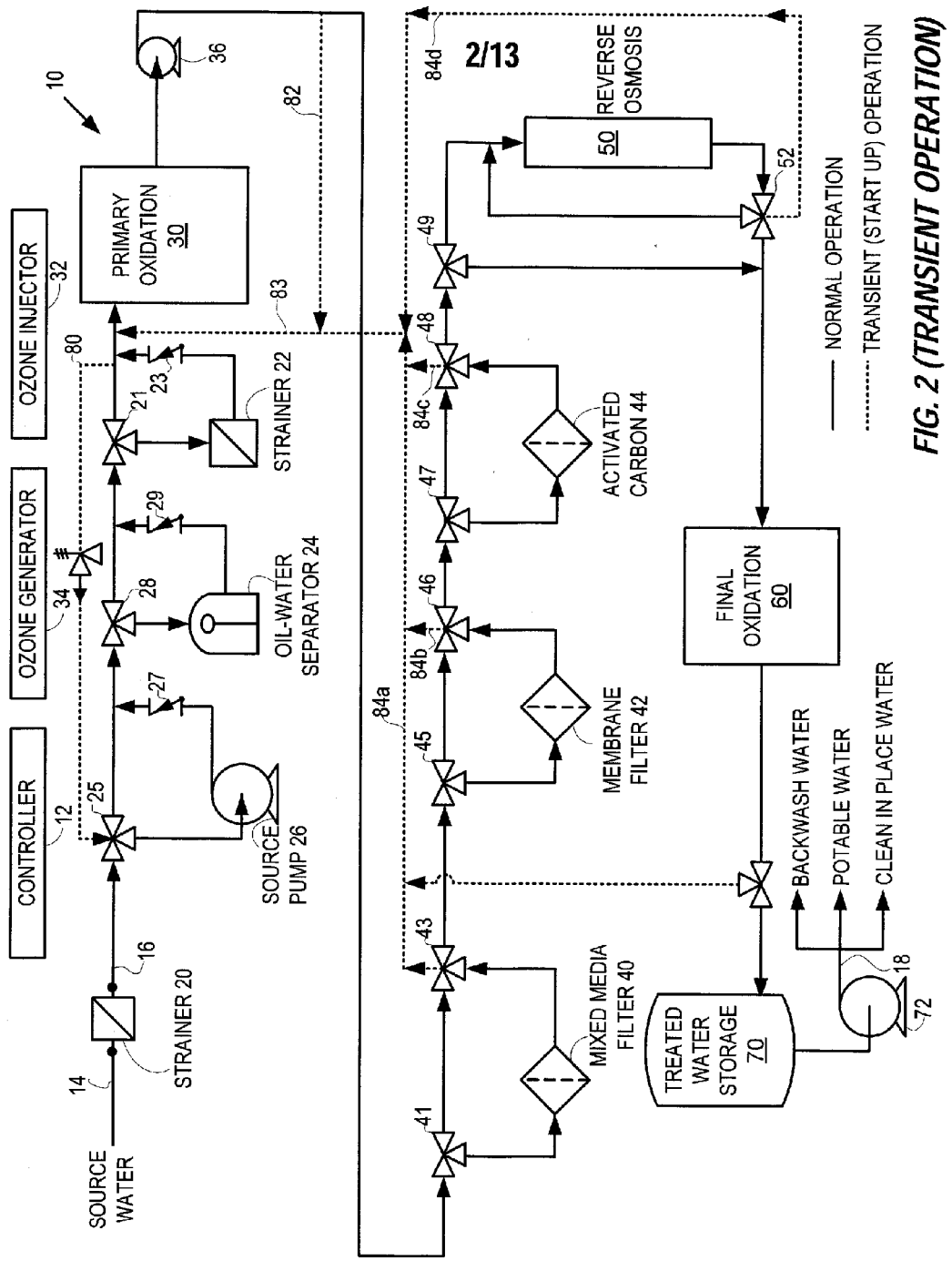
FIG. 2 (TRANSIENT OPERATION)

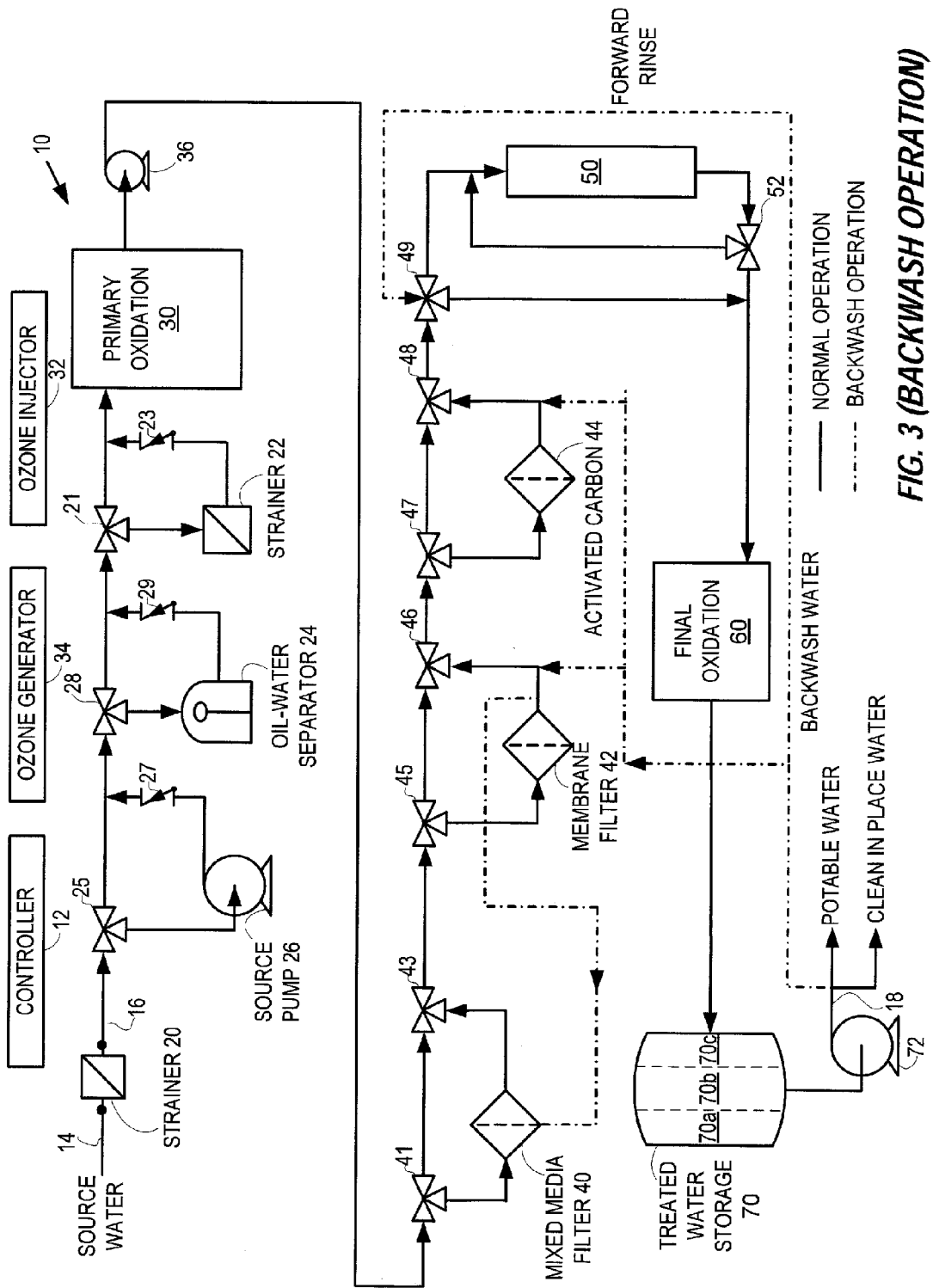
FIG. 3 (BACKWASH OPERATION)

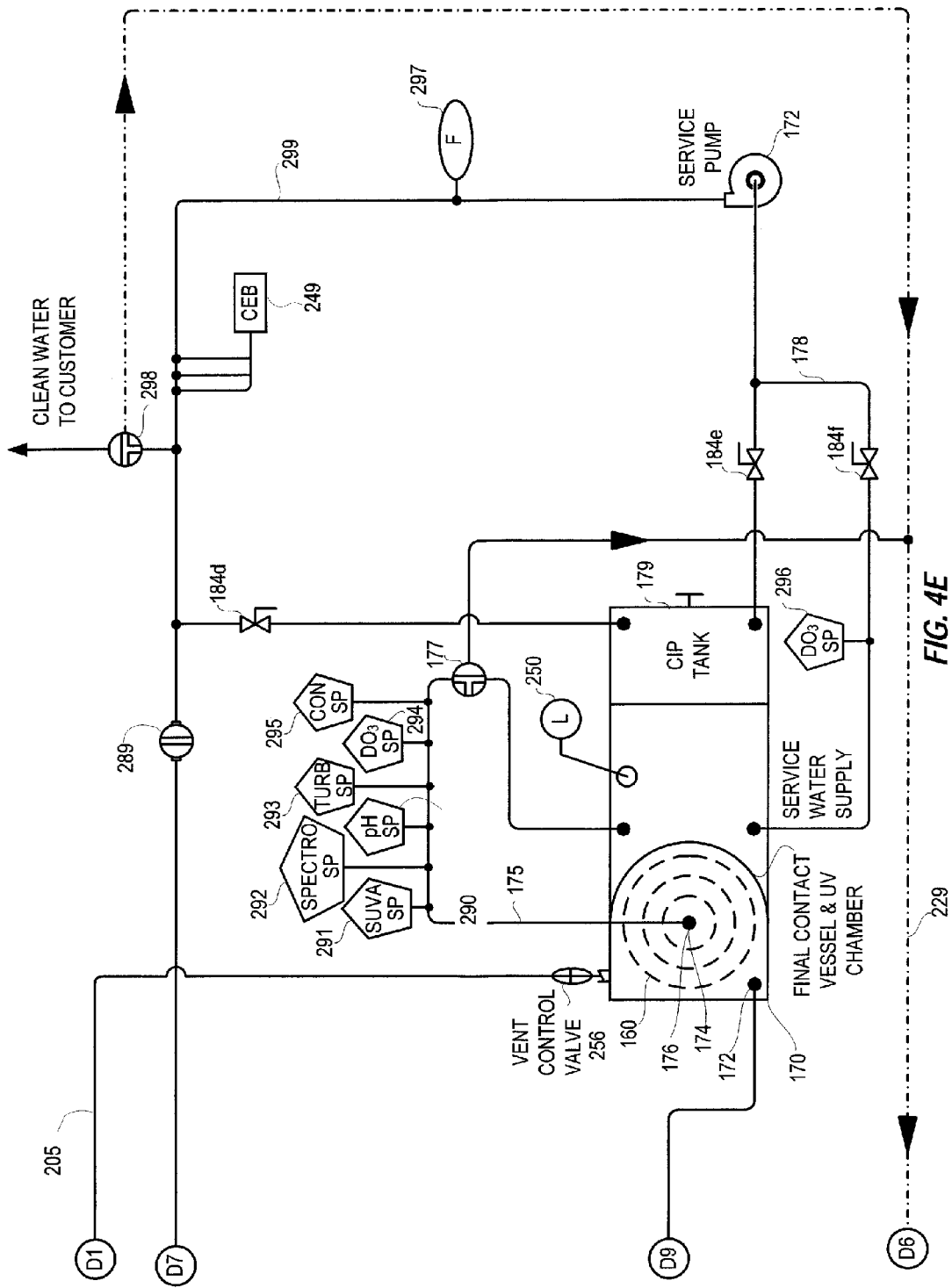

SELF-CONTAINED PORTABLE MULTI-MODE WATER TREATMENT SYSTEM AND METHODS

CROSS-REFERENCE TO RELATED APPLICATIONS

This application claims priority pursuant to 35 U.S.C. 119 to provisional U.S. patent application Ser. No. 61/216,165 entitled "Self-Contained Portable Water Treatment Apparatus and Methods with Automatic Selection and Control of Treatment Path," filed May 14, 2009, which is hereby incorporated herein by reference.

BACKGROUND

1. Field of Invention

The present invention relates to the field of water treatment, and in its preferred embodiments more specifically relates to self-contained, portable, automated apparatus and methods for treating water to remove various types of contaminants to produce potable water.

2. Description of the Related Art

In much of the world, the lack of clean, safe drinking water is a major problem, and the need for reliable sources of potable water is one of the most important factors in the survival of entire populations. Even when water is available it is very likely to be contaminated and unsafe for use. Common contaminants include entrained large debris, entrained small particle debris, suspended solids, salts, oils, volatile organic compounds (VOCs) and other chemicals, as well as living organisms and other pathogens. Different sources of water that require treatment before it can be safely used can include various ones of these common contaminants, or may include all of them. The substantial variation in the contaminants found in different water sources has made the design of treatment systems known and used in the prior art either a case-by-case process or a one-fits-all process. A treatment system designed and constructed with a few treatment modules to remove only selected contaminants reflective of the anticipated raw water source cannot effectively treat water in the event that an additional contaminant is introduced to the source water, either permanently or intermittently, such as when a natural or man-made disaster occurs that changes the contaminants in the source water. A one-fits-all treatment system designed to treat source water for the removal of all possible contaminants, whether actually present or not, can be considerably more costly to construct, operate and maintain than a system that treats only for contaminants actually present.

Portability and interchangeability of treatment system apparatus is also a problem that is detrimental to the goal of making safe drinking water more readily available. Portable water treatment systems are needed for a wide variety of different scenarios and geographic locations where the source water is of unknown or variable quality. Portable water treatments systems commonly need to be deployed as part of a disaster relief response. For example, conventional water treatment systems located in the New Orleans area, which were intended to treat fresh water from the Mississippi River or local lakes, were incapable of treating the contaminated mixture of fresh and salt water, debris, oil, and chemicals in the source water supply immediately following Hurricane Katrina. Other types of portable treatment systems are needed to provide adequate homeland security responses, such as responding to a chemical or biological terrorist attack which contaminates domestic fresh water sources. The military, mining companies, and petroleum exploration and production companies also need portable treatment systems when deploying to remote areas lacking existing water treatment infrastructure in order to provide potable water for its personnel. Portable treatment systems can also provide an effective source of potable water in underdeveloped countries lacking adequate water treatment infrastructure for their people.

Especially in underdeveloped countries and in remote areas anywhere, transporting, setting up, operating, and maintaining water conventional treatment equipment and installations can be difficult, and sometimes impossible. Operation and maintenance of conventional equipment and systems often requires trained personnel, who may not be available or may be unreliable.

Environmental factors where water treatment equipment is located, or needed, can also present significant difficulties, both in terms of equipment operating parameters and in terms of equipment maintenance and protection. For example, in high temperature locations the ambient temperature may be too high for equipment to operate for more than short periods without damage. In very humid locations, condensation can damage equipment components, including but not limited to electrical and control devices. Salt air can create and accelerate corrosion problems that interfere with operation and shorten the useable life of treatment equipment.

There have been a number of attempts to develop portable self-contained water purification systems to produce potable water in the past for specific scenarios and geographic locations. The success of such prior portable systems has been limited. The U.S. military has sought to develop mobile water treatment systems for use with deployed military units; however, such units have encountered deficiencies in operation and in being able to successfully remove a wide variety of contaminants. Others have sought to develop water purification systems that produce potable water from virtually any raw water source using a variety of different inline treatment processes which remain in operation regardless of the need for all the treatment process steps. Yet the problems described hereinabove have not been fully addressed in the prior art, and there remains an unfulfilled need for a water treatment system, including apparatus and methods of operating, that are readily portable, protected against harsh environments, highly effective in contaminant removal, fully automatic in operation, and automatically subjects source water to the treatment steps appropriate for removing contaminants present in the source water, and automatically bypasses treatment steps unnecessary for production of clean, safe, potable water.

The present invention, which addresses and fills the needs outlined above and overcomes the deficiencies of the prior art, will be described below, with reference to the accompanying drawing figures and illustrations.

SUMMARY OF THE INVENTION

Briefly, the present invention provides a novel system and methods for treating water from a raw water source to produce potable water. The system for treating water to produce potable water includes a conduit subsystem having an inlet for receiving water from a raw water source and an outlet for potable water through which the water can flow from the inlet to the outlet; a plurality of pumps connected to the conduit system wherein the pumps can drive the flow of the water through the conduit system; and a plurality of water treatment subsystems connected to the conduit system. The water treatment subsystems include a strainer subsystem for removing particulates of a size that could potentially disrupt the water treatment system; a primary oxidation subsystem downstream of the strainer subsystem for the primary treatment of the strained water; an ozone injector coupled to the primary oxidation subsystem for injecting ozone into the primary oxidation subsystem for the oxidation of contaminants in the strained water; at least one filtration subsystem for removing smaller particulates from the water wherein the at least one filtration subsystem is selected from the group consisting of mixed media filtration elements, micro-filtration membrane elements, ultra-filtration membrane elements and activated carbon filter elements; a reverse osmosis subsystem for removing at least dissolved contaminants from the water; and a final oxidation subsystem for further oxidizing and disinfecting the water received from subsystems upstream of the final oxidation subsystem wherein ozone can be injected and then ultraviolet radiation can be imparted into the final oxidation subsystem to further enhance disinfection and advanced oxidation.

The system further includes a plurality of sensors wherein each of the sensors is positioned in the water treatment system so that it can measure at least one of a set of characteristics of the water at its position wherein the set of characteristics of the water includes water flow rate, water pressure, water level and water quality parameters. Each sensor output signals that are representative of the measured characteristics. The system also includes a controller for receiving the output signals from the plurality of sensors at the plurality of locations in the treatment system wherein the controller can control the operation of the treatment system in a plurality of modes; select one of the plurality of modes of operation; monitor the measured characteristics of the water received from the plurality of sensors; use the measured characteristics received from the plurality of sensors to determine the quality of the water at a plurality of locations throughout the treatment system; automatically control the flow of water through the conduit subsystem based upon the selected mode of operation and the output signals of the measured characteristics from the plurality of sensors; automatically determine, based upon the selected mode of operation and the water quality parameter measurements at a plurality of sensor locations which of the plurality of the subsystems is needed to produce potable water at the output; and automatically direct the flow of water through the conduit subsystem to bypass the water treatment subsystems and elements that are not needed to produce potable water. The modes in which the controller may be operated may include a transient mode of operation and a normal processing mode of operation.

The method of treating raw water to produce potable water includes the steps of receiving water from a raw water source into an inlet of a conduit subsystem of a water treatment system having a plurality of treatment subsystems for providing a plurality of water treatment processes, the conduit subsystem also having an outlet for potable water through which the water can flow from the inlet to the outlet; sensing a plurality of characteristics of the water at a plurality of locations in the water treatment system with a plurality of sensors wherein the set of characteristics of the water comprises water flow rate, water pressure, water level and water quality parameters; outputting signals from each of the plurality of sensors that are representative of the water characteristic measured by such sensor. The method further includes the step of receiving the output signals from the plurality of sensors located at the plurality of locations at a controller which controls the operation of the water treatment system wherein the controller monitors the measured characteristics of the water received from the plurality of sensors; pumps water from the raw water source through the conduit subsystem if the water pressure of the water from the water source is too low for operating the water treatment system; selects one of a plurality of modes of operating the water treatment system based upon the measured water characteristics; uses the output signals of the measured characteristics received from the plurality of sensors to determine the quality of the water at a plurality of locations throughout the water treatment system; automatically controls the flow of water through the conduit subsystem based upon the selected mode of operation and the output signals of the measured characteristics from the plurality of sensors; and automatically determines, based upon the selected mode of operation and the water quality parameter measurements at a plurality of sensor locations, which of the plurality of treatment steps are needed to produce potable water at the outlet; and automatically directs the flow of water through the conduit subsystem to bypass the treatment subsystems for the treatment processes that are not needed to produce potable water. The plurality of water treatment processes selectable by the controller includes straining from the water particulates of a size that could potentially disrupt the water treatment system; primarily treating the strained water in a primary oxidation treatment subsystem by injecting ozone into the primary oxidation treatment subsystem for the oxidation of contaminants in the strained water; filtering smaller particulates from the water using at least one filtration treatment subsystem wherein the at least one filtration treatment subsystem is selected from the group consisting of mixed media filtration elements, micro-filtration membrane elements, ultra-filtration membrane elements and activated carbon filter elements; removing dissolved solids from the water using a reverse osmosis treatment subsystem; further disinfecting the water by injecting ozone into the water in a final oxidation treatment subsystem; and imparting ultraviolet light into the water in the final oxidation treatment subsystem to create hydroxyl radicals to oxidize any remaining contaminants [and to destroy substantially all of any remaining injected ozone].

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is an illustration of an embodiment for a self-contained portable water treatment system under normal flow operating conditions;

FIG. 2 is an illustration of an embodiment for a self-contained portable water treatment system during transient operation;

FIG. 3 is an illustration of an embodiment for a self-contained portable water treatment system during backwash flow operating conditions;

FIG. 4E is the fifth of a set of five related detailed schematic illustrations of an embodiment for a self-contained portable water treatment system;

DETAILED DESCRIPTION OF THE ILLUSTRATIVE EMBODIMENTS

Figure 4A:
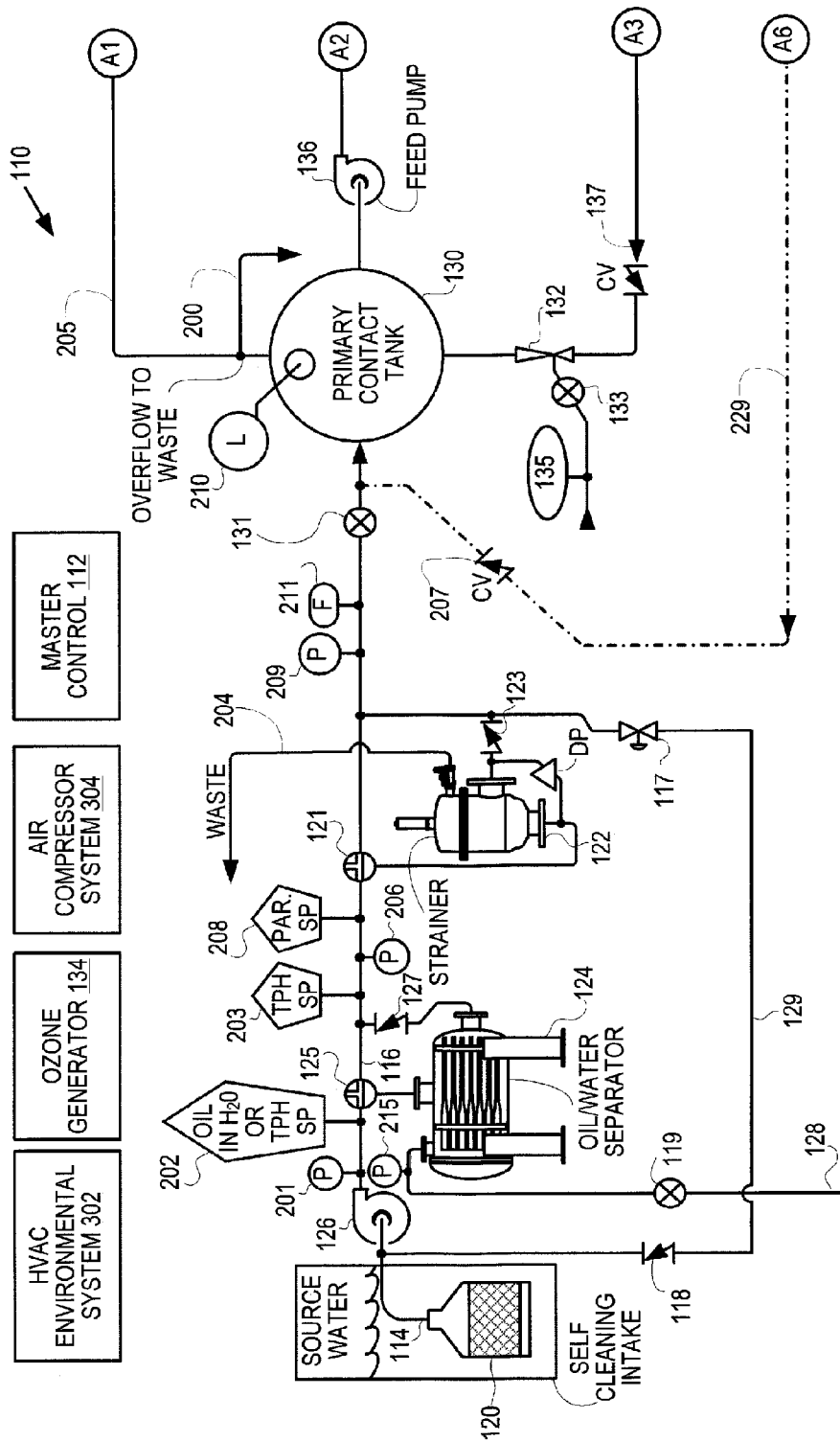
FIG. 4A is the first of a set of five related detailed schematic illustrations of an embodiment for a self-contained portable water treatment system.

The principles of the presented embodiments of the system and methods of the present invention and their advantages are best understood by referring to FIGS. 1-7B.

In the following descriptions and examples, specific details may be set forth such as specific quantities, sizes, etc., to provide a thorough understanding of the presented embodiments. However, it will be obvious to those of ordinary skill and creativity in the art that the embodiments may be practiced without such specific details. In many cases, details concerning such considerations and the like have been omitted inasmuch as the details are not necessary to obtain a complete understanding of any and all the embodiments and are within the skills and creativity of persons of ordinary skill in the relevant art.

In the illustrative embodiments, a portable, self-contained, multi-mode, automated water treatment system and methods for operating the system are depicted that are capable of automatically treating and purifying contaminated water from a variety of raw water sources using a variety of selectable water treatment processes. The water source may be a tank or vessel, but it is to be understood that the term "water source" may be any of a wide variety of sources, including but certainly not limited to lakes, streams, ponds, oceans, and discharged water from other processes.

The system includes sensors that measure characteristics of the water, including water quality parameters, at various locations throughout the system. The sensors output signals to a controller. The controller can automatically select one of a variety of modes of operation based upon the measured water characteristics at various sensor locations throughout the system. In the illustrative embodiments, the modes of operation of the system include "normal operation", "transient operation", and "backwashing operation". "Transient operation" is defined for the purposes herein as operation during the startup of the system until a steady state condition is reached or operation during an "upset" condition. "Normal operation" is defined for the purposes hereof as the mode of operation of the treatment system after the completion of the startup of the treatment system and the occurrence of steady state conditions or after an "upset" condition has been resolved. "Backwashing operation" is defined as when subsystems or elements of the system or subsystems are being cleaned by employing either backwashing methods or "clean-in-place" methods.

The controller can automatically use the measured water characteristics to determine the water quality at various locations throughout the treatment system and, then, based upon the selected mode of operation and the measured water quality parameters, automatically select and control which of the treatment processes are needed to produce potable water. In response to such determinations, the controller can then automatically direct the flow of the water to bypass any unnecessary treatment subsystems and processes. Thus, the controller automatically selects and controls the water treatment path through the treatment system based upon the output signals from a variety of sensors located throughout the system. The water treatment system is preferably configured to fit in a standard-sized commercial shipping container, which will allow it to be shipped and deployed in its operational configuration saving setup time and need for additional operator skill.

FIG. 1 provides a simplified illustration of the major components of one embodiment of the water treatment system 10 and the principal water flow paths through the treatment system 10 during normal operation. The treatment system 10 is under the control of a conventional programmable controller 12 operating applications software specifically developed for the system 10. Typically, water from a raw water source is received into the inlet 14 of a conduit subsystem 16 of the treatment system 10. The conduit subsystem 16 provides a water flow path through the treatment system 10 to an outlet 18 for potable water. The treatment system 10 may include a variety of different water treatments subsystems, including an optional debris strainer 20, a particulate strainer 22, an optional oil-water separator 24, a primary oxidation subsystem 30, a series of filtration subsystems 40, 42, and 44, a reverse osmosis subsystem 50, and a final oxidation subsystem 60. The resulting treated potable water is held in a finished water storage tank 60, where it is held for distribution as needed, and also as a source of clean water for backwashing or clean-in-place processing during the "backwashing operation" mode of operation.

In the event the controller 12 receives signals from pressure sensors (not shown) that the pressure of the source water entering the conduit subsystem 16 is insufficient for proper system operation, the controller 12 may direct the raw source water through a suitable valve 25 in the conduit subsystem 16 to a raw water source pump 26 to pump the water source into the treatment system. The source pump(s) 26 used is preferably capable of handling solids without damage. Pressurized water flowing from the pump 26 may then be directed back through a suitable valve 27, such as a check valve, into the primary water path of the conduit subsystem 16. In the event that raw water is available from a pressurized source at a sufficiently high pressure to meet process flow requirements, the raw water pump 26 need not be operated at all. The source pump 26 may also be used to raise the pressure of incoming water to meet requirements.

The system 10 may have the optional debris strainer 20 which the operator can manually place into the incoming source water flow path at the input into the conduit subsystem 16 to prevent the entry of debris, large particulates, and other objects large enough to damage the pump 26 in the event the operator believes that the source water may contain such debris or objects. An oil-water separator 24 may be an optional component of the system 10 in most instances because it is anticipated that most raw water sources to be treated using the system 10 will not be contaminated by oil to a degree that the amount of oil present in the water will not be removed by other process elements. However, inclusion of oil-water separator element 24 may be included in the treatment system 10 by having the controller 12 direct the source water through valve 28 in the conduit subsystem 16 to the oil-water separator 24 to separate oil in the source water from the water prior to redirecting the water through a suitable valve 29, such as a check valve for example, into the primary water path of the conduit subsystem 16.

The source water may then be directed through a suitable valve 21 to the particulate strainer 22 which can act as a physical barrier to further trap and remove from the water solids of particulate sizes that could potentially inhibit water flow, clog filtration media and/or otherwise disrupt the treatment processes of the treatment subsystems located downstream of the strainer 22. Strained water from the particulate strainer 22 may then be directed back to the primary water flow path of the conduit subsystem through a suitable valve 23, such as a check valve.

After straining, the source water is directed by the conduit subsystem into a primary oxidation subsystem 30 where the water is treated with ozone injected through an ozone injector 32 from an ozone source. Preferably, the ozone source in a local ozone generator 34. Ozone addition enhances coagulation of smaller particles remaining in the raw source water, making them easier to filter. In addition, ozone-mediated oxidation prior to filtration will remove most taste and odor causing compounds, enhance water clarity and aesthetics, oxidize iron and manganese compounds, and provide an initial disinfection to eliminate bacterial and viral pathogens. Ozone addition prior to filtration also enhances filter performance and filter media longevity.

Preferably, the primary oxidation subsystem 30 includes a dissolved air flotation element (not shown) to be described hereinafter. When the primary oxidation subsystem 30 includes a dissolved air flotation element, the ozone injector is adapted to inject a combination of air and ozone into the primary oxidation subsystem for enhancing the separation of organic contaminants and oil from the water and the disinfection and oxidation of the resulting water separated from the organic contaminants and oil. Unlike the prior strainers and oil water separator treatment elements, the primary oxidation system 30 is not an optional treatment element and remains in the water treatment conduit flow path at all times.

After primary oxidation, a feed pump 36 fluidly connected into the conduit subsystem downstream of the primary oxidation subsystem 30, feeds or pumps the partially treated water through the remainder of the treatment subsystems, except when the reverse osmosis subsystem is used. When the reverse osmosis subsystem is required, feed pump 136 delivers the partially treated water to a booster pump located immediately upstream of the reverse osmosis subsystem.

The partially treated water pumped from the feed pump 36 can be directed by the controller 12 through a suitable valve 41 to the first of one or more filtration subsystems to remove smaller particulates from the water. Preferably, the water flow can be directed by the controller 12 through a mixed media filtration subsystem 40 as the next step in the treatment process. Such a mixed media filtration subsystem 40 may comprise a mixture of anthracite and sand. The mixed media filtration subsystem is preferably designed to physically remove particles larger than approximately 1 micron from the partially treated water prior to treatment in the next treatment subsystem. Treated water exiting the filtration subsystem 40 may then be redirected to the primary water flow path through the conduit subsystem through another suitable valve 43.

The controller 12 may next direct the treated water to a membrane filtration system 42 through a suitable valve 45. In membrane filtration subsystem 42, any remaining undissolved or suspended solids ranging in size down to approximately 0.1 microns may be removed. Large bacterial organisms may also fall within the particle size range for which membrane filtration is effective, and any such bacteria present will be removed in this treatment process. Filtration membranes used in this subsystem encompass membranes often referred to as micro-filtration membranes, as well as those referred to as ultra-filtration membranes, depending on membrane porosity, used singly or in combination. The use of membrane filtration instead of the conventional sedimentation plus filtration technique substantially reduces the volume of the filter media required, and thus reduces treatment apparatus size and total space requirements. Treated water exiting the subsystem 42 may then be redirected to the primary water flow path through the conduit subsystem 16 through another suitable valve 46.

The controller 12 may next direct the treated water through an activated carbon filtration subsystem 44 through a suitable valve 47. The filtration subsystem 44 may comprise one or more vessels containing granular activated carbon, and is utilized downstream from the membrane filtration element to adsorbs VOCs and/or other dissolved chemical compounds remaining in the partially treated water. Activated carbon provides a barrier against the passage of contaminants such as pesticides, industrial solvents and lubricants that are physically absorbed by the carbon. Partially treated water exiting the activated carbon filtration subsystem 44 may then be redirected through a valve 48 to the primary water flow path through the conduit subsystem.

Because the raw water supply may contain dissolved salts, in concentrations which may range from slightly brackish to the salinity of seawater, the system 10 also may include a reverse osmosis subsystem 50, which utilizes a semi-permeable membrane desalination process. For raw water with low concentrations of salts the reverse osmosis subsystem can be operated in a serial or sequential mode and achieve satisfactory results. However, when salinity is high, as when the raw water to be treated is seawater, the reverse osmosis subsystem can be set to operate in a single pass mode. In alternative embodiments, water exiting the reverse osmosis subsystem 50 may be redirected by the controller 12 through a suitable valve 52 back to the entrance of the reverse osmosis subsystem 50. The multi-mode operation provided by the reverse osmosis subsystem allows a single membrane grade to successfully treat waters with a wide range of salt concentrations. In addition to desalination, the reverse osmosis subsystem 50 will also function to remove many chemical contaminants that may remain in the partially treated source water. Treated water exiting the reverse osmosis subsystem that the sensors show meets suitable water quality standards may then be directed through valve 52 to final oxidation subsystem 60.

The final oxidation subsystem 60 provides a disinfection and advanced oxidation process ("AOP") which is used to treat the incoming partially treated water to destroy or remove any remaining pathogenic organisms that were not removed or destroyed in upstream treatment elements and subsystems. This second or final oxidation subsystem 60 preferably comprises a stainless steel contact chamber fitted with an ozone injector, in which ozone from the ozone source is injected in sufficient concentrations that the water is in contact with the ozone for a sufficient period of time to accomplish a final disinfection of the treated water. In some embodiments, the water exiting the contact chamber of this second oxidation subsystem after final disinfection may be routed to an ultraviolet light exposure chamber to convert any residual ozone into OH hydroxyl radicals to destroy any remaining toxic compounds. The treated finish water is then routed to the treated water storage tank 70 where it may be held for later distribution. The treated water reaching the storage tank 70 is free of impurities, and is clean and safe for human consumption and use. A service pump 72 controllable by controller 12 is fluidly connected between the water storage tank 70 and the outlet 18 of the conduit subsystem 16, and the controller 12 can direct the pump 72 to pump water from the tank 70 for distribution. The treated water may also be used as a source of clean water for backwashing or cleaning-in-place system elements when needed, as will be described in more detail hereinafter.

Preferably, the ozone used in the treatment system is generated in an on-site ozone generator 34. Generation of ozone requires only ambient air and electricity, so it is much more feasible to produce the required ozone on-site than to transport chlorine and/or other treatment chemicals to the location of the water to be treated. The ozone used in the system 10 is generated as needed rather than being stored, as would be necessary if, e.g., chlorine were used for disinfection. Chlorine is a very hazardous gas, and storage of chlorine to be used as a disinfectant creates substantial risk of health and environmental damage. The use of ozone in the system is also preferred because ozone has the advantage of being one of the most powerful oxidants known. Ozone can be easily monitored and measured using simple field tests, unlike other non-chlorine agents, which require the use of delicate and expensive test equipment that is not well suited for field use.

The water treatment system 10 includes apparatus for multiple types of treatment process steps that, in combination, is capable of treating raw source water for the removal of the full range of contaminant materials that can be realistically expected to be present in a wide variety of raw water sources. The system 10 includes treatment subsystems and elements with the capacity to address and treat the highest anticipated levels of contaminant and impurity concentrations. The controller 12 can, however, based upon the condition of the water moving through the system, determine whether a particular treatment step is needed, and automatically by-pass any unnecessary treatment subsystems and elements. The controller's ability to determine the presence, or absence, of contaminants in the water at various locations throughout the treatment system and automatically adjust the treatment steps and parameters needed to produce potable water maintains the highest achievable operating efficiency. The high degree of efficiency achieved by the system 10 minimizes operating costs as well as equipment wear.

While the system shown in FIG. 1 is capable of treating and purifying highly contaminated water by including all treatment subsystems and elements in the water treatment flow path, it will be recognized that not all raw water sources will be so severely contaminated as to require the full treatment scope to provide potable water. In prior art approaches it has been common to customize each treatment system to include only treatment apparatus that will be used at a particular site to address a specific set of contaminants, thereby limiting its ability to treat water from the raw water source at the site if the condition of the raw water changes. Under such prior art approaches there was no standardization in construction, and each system became an independent design and build project—an inherently less efficient approach to construct treatment systems on site, in comparison to a production facility set up to optimize the construction process. This practice is also more likely to produce treatment systems with differing operating parameters and control requirements and require more extensive operator training In summary, the most economical and efficient treatment approach is to treat raw water from a particular source for only the contaminants that are actually present in that water source. The system provides that capability with a standardized set of treatment subsystems and elements in a standardized configuration. Standardization of the system apparatus and construction of systems offsite greatly facilitates the construction process and reduces costs. In the illustrated embodiment of the system 10, treatment elements may be included in the flow path of the water being treated, or excluded from the flow path, depending upon whether the type of contaminant addressed by an element is or is not present in the raw water.

FIG. 2 depicts the additional principal water flow paths of the system 10 of FIG. 1 during the "transient" mode of operation, which is selected by the controller 12 during the startup of the system 10 or during an "upset" condition in the system detected by the controller 12. The subsystems and elements of FIG. 2 corresponding to the same parts of FIG. 1 are designated with like reference numerals.

During the startup of the system 10, the controller 12 selects the "transient" mode of operation of the system 10, which remains in the transient mode until the controller determines that the water quality of the water entering the storage tank is that of potable water and that a steady state condition in the water quality has been achieved. Until such a determination is made, the controller 12 initially directs the system to recycle the water upstream of the primary oxidation system 30 through a return conduit 80 to valve 25 upstream of the source pump 26, as shown as a dotted line in FIG. 2, until the controller determines that the water quality of the water immediately upstream of the primary oxidation subsystem 30 is of sufficient quality that it can be successfully treated by the primary oxidation subsystem 30.

The controller 12 then directs the water to the primary oxidation subsystem 30 for primary treatment and then recycles the water to the input to the primary oxidation subsystem through conduit 82 and 83 until the water quality of the water downstream of the primary oxidation system 30 is of sufficient quality to be treated by at least one of the filtration subsystems 40, 42, and 44. In a like manner, the partially treated water exiting the filtration subsystems, the reverse osmosis subsystem and the final oxidation subsystem is recirculated through conduits 84a and 83, 84b and 83, 84c and 83, 84d and 83, and 84e and 83, respectively, until the partially treated water exiting each of such treatment subsystems discharges water of a sufficient water quality to be treated by the next subsystem located downstream of it.

FIG. 3 depicts the principal water flow paths of the system of FIG. 1 during the backwashing mode of operation. The subsystems and elements of FIG. 3 corresponding to the same parts of FIG. 1 are designated with like reference numerals.

As with all filtration elements or components, filter media will become loaded with contaminants filtered from the fluid flowing through the element, and will require replacement, or backwash to flush accumulated contaminant materials from the media and out of the filtration subsystem. In addition to treatment process flow through the elements of the system, FIG. 3 also shows a backwash flow path. Water used for backwash in the example of FIG. 3 is drawn from the finished water storage tank 70 and is routed through the treatment element apparatus that is to be cleaned, in a path that may be essentially a reverse of the illustrated treatment flow path during normal operation. Backwash water, with entrained contaminant materials, can be returned to the raw water source, or otherwise appropriately disposed of.

The treated water storage tank 70 may be partitioned into three separate storage volumes 70a, 70b, and 70c, respectively, for use for storing finished potable water for later distribution; for use as a source of clean water for backwashing treatment elements, and another for use as a source of clean-in-place water for cleaning the treatment elements in place. The source for backwash water and the backwash flow paths are both subject to variation while remaining within the scope of the invention, and the paths shown by the dashed lines in FIG. 3 are not to be taken as limiting. It will be understood that backwashable elements and components of the system 10 will not require backwash at the same time, due to factors such as uneven contaminant loading. The controller is designed and operated to be capable of establishing the most efficient and effective backwash flow path in differing loading circumstances, typically based upon pressure differentials detected by sensor components.

Detailed System Description

FIGS. 4A through 4E depict a substantially more detailed illustration of one embodiment of the subsystems, elements, control system components, and other apparatus of the system 10 of FIGS. 1 through 3 and the treatment process water flow during transient, normal and backwashing modes of operation.

The water treatment system 110 is under the control of a conventional programmable controller 112 operating applications software specifically developed for the system 110. The controller is part of a sensing and control subsystem that includes sensors to detect the presence, absence, or magnitude of certain contaminants. The subsystem also includes various actuation means (such as motorized valves) which receive signals from the processor(s) in the controller and activate as directed to establish the flow path determined to be appropriate for the treatment needed.

The controller 112 receives a variety of input signals from the variety of sensors (to be described hereinafter) electrically coupled to the controller which measure the characteristics of the water, including various water quality parameters, at a variety of sample points ("SPs") located throughout the treatment system 110. The applications software of the controller receives these signals and determines which valves, elements and other components of the system 110 electrically connected to the controller need to be sent output signals in order for the controller 110 to select the mode of operation and the treatment subsystems and elements of the system 110 to be operated during a given mode and time interval.

Sensor apparatus, processors, and automatically operable valves appropriate for use in the sensing and control portions of the system 110 are known, and any such components that will provide the performance for effective operation of the system in accordance with the method of the invention may be used.

The network of sensors utilized in the system is designed and intended to collect and transmit a wide array of operational information to the control system processor(s), which maintain an ongoing monitoring of system operation and element effectiveness in real time and in comparison to preselected parameters, and generate command signals to, e.g., the motorized valves, so as to make adjustments and changes needed to maintain optimal process conditions. The comprehensive array of sensors, processor(s), and physical equipment actuators provides sophisticated control over system operations and allows the system 110 to operate for extended periods without human intervention. The comprehensive nature of the control system reduces the need for onsite operator time and significantly reduces operator training, saving both time and money.

As depicted in FIGS. 4A through 4E, water from a raw water source is typically received into the inlet 114 of a conduit subsystem 116 of the treatment system 110. The principal treatment subsystems and elements that are fluidly coupled or can be fluidly coupled by the controller 112 to the conduit subsystem 116 include an optional suitable debris strainer 120, source pump 126, an optional oil-water separator 124, a particulate strainer 122, a primary contactor/oxidation tank 130, preferably including a dissolved solids flotation element (not shown), a feed pump 136, mixed granular media filter elements (140a through 140c), membrane filter elements (142a through 142g), granular activated carbon filter elements (144a and 144b), reverse osmosis elements (150A1, 150A2, 150B1, and 150B2), a final contact vessel 170 with an ultraviolet light source, a clean water storage tank or service water supply tank 170, and a service pump 172. The conduit subsystem 116 provides a water flow path through various selectable treatment subsystems and elements described herein below of the treatment system 110 to an outlet 118 for potable water. Clean treated water in the service supply tank 170 is held for distribution as potable water as needed, and also as a source of clean water for backwash and/or clean in place (CIP) operations during the backwashing mode of operation.

Debris Strainer and Source Pump

Similarly to the embodiment of the system 10 of FIGS. 1-3, the system 110 may have an optional debris strainer 120 which the operator can manually place into the incoming source water flow path at the input 114 into the conduit subsystem 116 to prevent the entry of debris, large particulates, and other objects large enough to damage the pump 126 in the event the operator believes that the source water may contain such debris or objects. A suitable strainer 120 is an autowashing debris strainer.

FIG. 4A depicts a water source from which raw water can be drawn or admitted to the system 110. When the water pressure of the source water is too low to drive water into the treatment system 110, the controller, in response to certain sensor signals described herein below, can send control signals to the source pump 126 to operate the source pump to draw water from the water source into inlet 114 of the conduit subsystem 116. For example, the controller may activate the source pump 126 when a demand signal is received by the controller (i) from pressure sensor 201 fluidly coupled to the conduit subsystem immediately after the source pump to indicate that the pressure of the incoming source water is insufficient for the treatment system to operate properly or (ii) a demand for treated water (which may occur when, e.g., the level sensor 250 in the clean water storage tank 170 senses that the level in the clean water storage tank or service water supply tank 170 drops below a predetermined level). If so, the system controller 112 will initiate the treatment sequence.

In the event that raw source water is available from a pressurized source at a sufficiently high pressure to meet process flow requirements, the source pump 126 need not be operated. If the water pressure is outside the range programmed into the system controller 112, the controller can adjust pressure and flow in a manner to be described hereinafter for the desired balance. The type of source pump 126 that may be used is preferably a self-grinding style which is capable of handling solids, without damage, below the particle size allowed by the auto washing strainer 120. As previously noted, the strainer 120 may also be removed from the system process train if the raw water source contains particles below the threshold required for its use.

Oil-Water Separator

An oil-water separator 124 may be an optional component of the system 110 because it is anticipated that most raw water sources to be treated using the system 110 will not be contaminated by oil to a degree that the amount of oil present in the water will not be removed by other process elements. However, inclusion of oil-water separator element 124 may be included in the treatment system 110 by having the controller 112 direct the source water through the conduit subsystem 116 to the oil-water separator 124 to separate oil in the source water from the water prior to redirecting the water into the primary water flow path of the conduit subsystem 116.

With raw water flowing into the system 110 at an acceptable rate and pressure, a sample point ("SP") 206 for a hydrocarbon analyzer (or oil detector) electrically coupled to the controller can sense the presence or absence of "total petroleum hydrocarbons ("TPH") (hereinafter referred to as oil) contaminants in the raw water at the sample point. Downstream of the SP 206 is the oil-water separator 124, which may be included to remove undissolved or emulsified oil and fuel contaminants from the raw source water. If an oil contamination level is detected at SP 202, which exceeds a predetermined threshold value, an output signal will be sent by the hydrocarbon analyzer to the system controller 112. The controller will, in turn, provide a control signal to activate valve 125 to direct the raw water flow into the oil-water separator. Another SP 203 measures the TPH downstream of the oil-water separator. If the TPH is too high, a suitable auto control valve 131 is adjusted such that all or a portion of the water is recirculated through a pressure regulating valve 117 and a pressure check valve 118 in conduit 129 to the inlet to the source pump. A pressure sensor 206 coupled to the conduit downstream of the oil-water separator monitors the discharge pressure of the oil-water separator. Oil separated from the water is collected and removed through conduit 128 for disposal or reprocessing. A flow control valve 119 may be fluidly coupled into the conduit 128 to regulate the flow rate of the waste exiting the system through conduit 128. Another pressure sensor 208 may be coupled into the waste conduit 128 to measure the waste flow discharge pressure of the oil-water separator. The pressure measurements of pressure sensors 201, 206, and 215 are then used by the controller to determine the differential in pressure between the input, output and reject outlet of the oil water separator to adjust the control valve 119 of the waste conduit 128.

If the oil threshold is not met, the raw water will bypass the oil water separator and continue downstream. The oil-water separator 124 is located first in the treatment process train to allow the removal of oil type contaminates from the raw water at the earliest possible opportunity to prevent oil fouling and degradation of downstream process elements.

Particulate Strainer Filtration

A strainer 122, such as a self-cleaning automatic screen filter for example, may be fluidly coupled to the conduit subsystem 116 downstream of the oil-water separator 124. Strainer element 122 acts as a physical barrier to trap and remove from the water entering the downstream treatment elements solids of particulate sizes that could potentially inhibit water flow, clog filtration media and or otherwise disrupt the treatment process. A particle sensor sample point SP 208 or a turbidity sensor sample point (not shown) may be located upstream of the strainer 122 to provide information to the controller 112 as to whether the water being treated contains debris or particles larger than a predetermined threshold value. If the threshold value is met, the controller 112 will send a signal to actuate valve 121 and direct the water in treatment through the strainer element 122. Following the removal of particulates by the strainer 122, the partially treated water may be returned through a suitable valve 123, a check valve for example, to the primary water flow path. The rejected waste stream is returned through a conduit 204 to the source water or otherwise properly disposed of. If the threshold particle value is not met, valve 121 will be positioned by the controller 112 to allow the water in treatment to by-pass the strainer 122. Pressure sensor 209 measures the pressure and flow sensor 211 measure the flow of the water in the conduit 116 downstream of the strainer 122. Preferably, strainer 122 will be selected to remove particles of approximately 100 micron or larger from the raw water. This will control the size of particles reaching the mixed media filter elements 140a through 140c to improve their process efficiency and reduce the frequency of filter backwash required.

Primary Oxidation

The water in treatment next passes to the primary contact tank 130 for primary oxidation. Primary oxidation is performed by injecting ozone into the water in treatment and is performed in all operating configurations of the system 110. The water level in the primary contact tank may be monitored by a level sensor 210 and is controlled by adjusting flow control valve 131 based on feedback provided to the controller 112 by level sensor 210. When the level sensor 210 sends a demand signal to the controller for more water, the position of flow control valve 131 and the output of source pump 126 will be adjusted to maintain a predetermined water level in the primary oxidation tank or primary contact tank 130. Overflow waste is routed through conduit 200 back to the raw source source or otherwise properly disposed of Ozone may be injected into the primary contact tank 130 using water drawn from the same tank by feed pump 136, and directed through ozone injector 132. Ozone will be supplied to ozone injector 132 preferably by an ozone generator 134. As depicted in FIG. 4A, the amount of ozone supplied to the injector 132 may be controlled by the ozone flow control valve 133 based on a dissolved ozone reading taken at the dissolved ozone sample point 212 in the treatment process flow downstream of the primary contact tank 130. The controller will receive the input signal from the ozone sensor coupled to SP 212 and generate the control signal to the ozone flow control valve 133. If the concentration of ozone downstream of the primary contact tank 130 is not within a predetermined range, a signal is sent by the controller to either increase or decrease the rate of ozone injection, as needed. The rate of ozone injection may be measured by flow meter 135. The primary contact tank 130 is preferably a gravity cylinder (unpressurized) to reduce the amount of energy required to inject ozone into the raw water in treatment.

Preferably the primary oxidation tank 130 includes a dissolved air flotation element. When the tank 130 includes a dissolved air flotation element, the ozone injector is adapted to inject a combination of air and ozone into the primary oxidation subsystem for enhancing the separation of organic contaminants and oil from the water and the disinfection and oxidation of the resulting water separated from the organic contaminants and oil. Ozone is preferably used for several reasons. It is one of the most powerful disinfectant industrially available to eliminate bacterial and viral pathogens, it requires no consumables other than electricity, it enhances flocculation and coagulation of smaller particles remaining in the water in treatment, making them easier to filter, it lowers the surface tension of the water so particles come out of solution easier in the downstream mixed media filter elements (140a through 140c) and the membrane filter elements (142a through 142g), and it makes these same filter elements easier to backwash. Ozone inactivates algae and bio slimes created by algae which can cause bio fouling in the mixed granular media filter elements 140a through 140c and the membrane filter elements 142a through 142c. Bio fouling degrades the performance of these filters and reduces their effective filtration. In addition, ozone mediated oxidation prior to filtration can remove most taste and odor causing compounds, enhance water clarity and aesthetics, oxidize iron and manganese compounds, and provide an initial disinfection.

Preferably, the ozone injected into the treatment system (in both the primary contact tank 130 and the final contact chamber 160 is generated on-site by the ozone generator 134. Generation of ozone requires only ambient air and electricity, so it is much more feasible to produce the required ozone on-site than to transport chlorine and/or other treatment chemicals to the location of the water to be treated. The ozone used in the system 110 is preferably generated as needed rather than being stored, as would be necessary if, e.g., chlorine were used for disinfection. Chlorine is a very hazardous gas, and storage of chlorine to be used as a disinfectant creates substantial risk of health and environmental damage. Ozone can be easily monitored and measured using simple field tests, unlike other non-chlorine agents, which require the use of delicate and expensive test equipment that is not well suited for field use.

Feed Pump

A feed pump 136 may be located downstream of the primary contact tank 130. The feed pump 136 serves two primary purposes: it is the primary pump used to deliver partially treated water through the remaining system elements and other apparatus downstream of the primary contact tank 130 under most operational circumstances, and it is used to direct water to ozone injector 132. Inputs from pressure sensor 214, flow sensor 216, and level sensor 210 are the primary inputs used by the controller 112 to control the output of feed pump 136.

Mixed Media Filtration

Figure 4B:
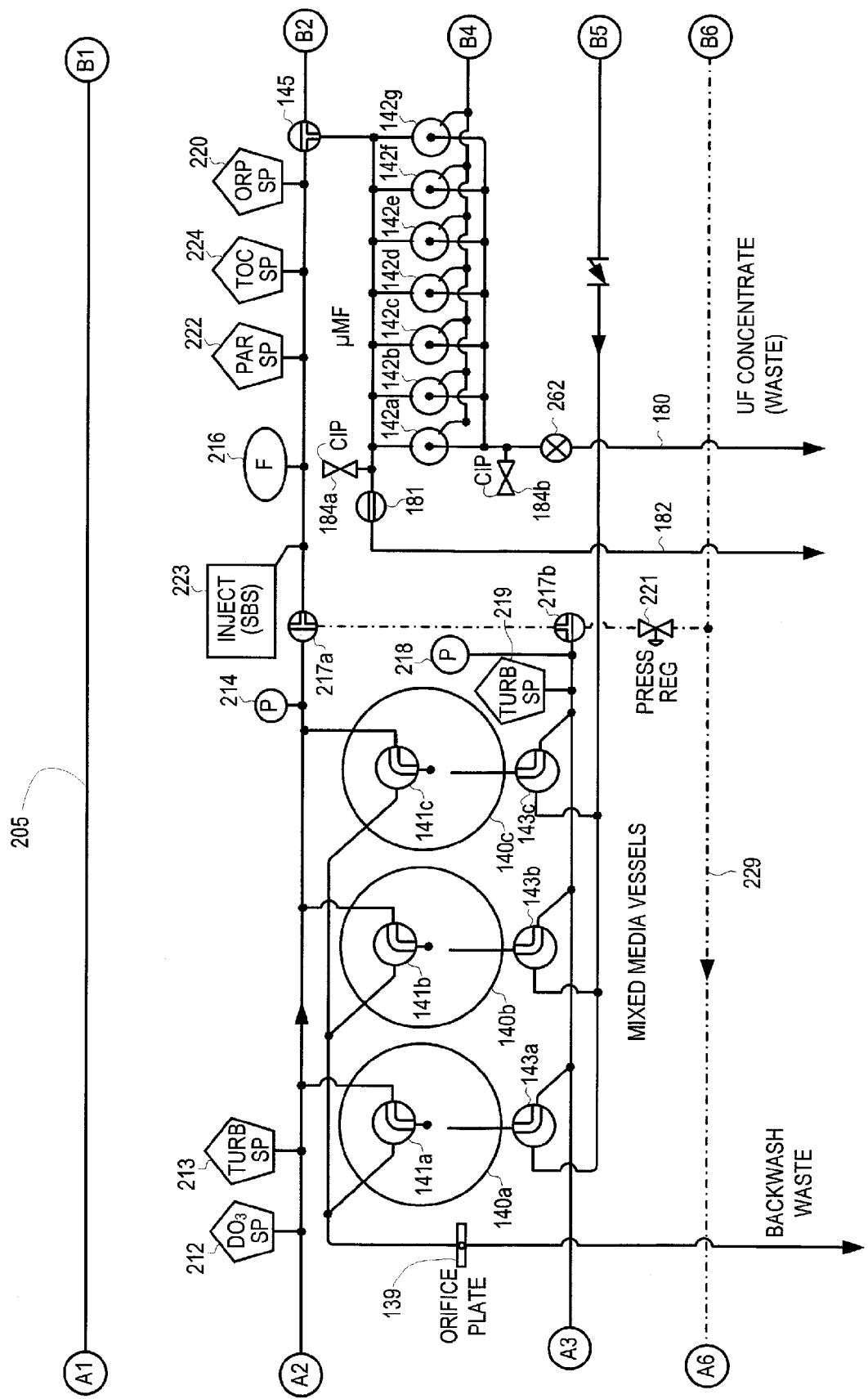
FIG. 4B is the second of a set of five related detailed schematic illustrations of an embodiment for a self-contained portable water treatment system.

As depicted in FIG. 4B, after primary oxidation, the partially treated water may flow through a plurality of mixed media filter elements, elements 140a through 140c for example, as the next step in the treatment process. The filter media used in these treatment elements typically include a mixture of commonly used materials (e.g. anthracite, sand, and garnet). These mixed media filter elements will physically remove gross particles larger than approximately 0.5 microns to 1 micron from the partially treated water prior to the subsequent processing step(s). Preferably, mixed granular media filters are used ahead of the plurality of membrane filter elements, elements 142a through 142g for example, because they can tolerate a heavier accumulation of solids and they demonstrate a more efficient capture and release of solids compared to membrane filters. Placing the mixed media filters ahead of the membrane filter elements therefore reduces fouling of the membrane filter elements which prolongs membrane filter throughput. The backwash water volume for mixed media filters is also lower than for membrane filters so capturing solids in a mixed media filter will result in less treated water being lost to waste due to frequent membrane filter backwashes.

The pressure differential between water entering the mixed media filtration elements and leaving the elements is measured by pressure sensors 214 and 218. The magnitude of the differential pressure is used by the controller 112 to determine whether a backwash operation is necessary to restore pressure and flow to within an acceptable range. Preferably, the mixed media filter elements 140a through 140c are configured for parallel flow so they can be independently controlled between the normal treatment processing mode of operation and the backwashing mode of operation. By noting the differential pressure measured by pressure sensors 214 and 218 and the output of the flow meter 216 prior to taking a mixed granular media filter vessel off-line and then selectively taking an individual mixed granular media filter element off-line and observing the change in output of the pressure sensors 214 and 218 and the simultaneous change in output of the flow meter 216 a calculation can be made by the controller 112 to determine which, if any, mixed media filter elements require backwashing. When a mixed media filter requires backwashing, that one element is taken out of the normal treatment flow mode and put into backwash flow mode while the remaining elements in the subsystem continue in the normal treatment processing mode. The controller activates suitable valves, valves 141a, 141b, 141c, 143a, 143b, and 143c for example, according to a predetermined algorithm implemented by the applications software of the controller to remove one filter element out of the treatment flow and direct process flow through the remaining filter elements. Water flow leaving the mixed media filter elements 140a through 140c is checked at oxidation reduction potential ("ORP") sample point SP 220 to ensure that no ozone remains in the partially treated water. The presence of too much ozone would be harmful to membrane filter elements 142a through 142g which are next in the treatment process train. Based on the ORP measurements taken at SP 220, the controller 112 can determine whether or not to activate the sodium bisulfite (SBS) injector 223 and if activated, how much SBS should be added to the partially treated water to neutralize the ozone present.

Membrane Filtration

As depicted in FIG. 4B, in the plurality of membrane filter elements, elements 142a through 142g for example, any remaining undissolved suspended solids in the partially treated water ranging in size down to approximately 0.1 microns are removed. On a limited basis, some of the dissolved contaminates may be removed as well. Readings of particle characteristics (size and number) by a particle counter or of turbidity by a turbidity meter (not shown) at SP 222, and of oxidation reduction potential ("ORP") at SP 220 are used to determine if the membrane filter elements 142a through 142g are needed to further treat the already partially treated water. If the particle count and/or turbidity are above a predetermined threshold, the controller will activate a suitable valve 145 to direct the partially treated water through the membrane filter elements. If the particle count and/or turbidity levels are below the threshold, the membrane filter elements 142a through 142g are bypassed. Bypassing the membrane filter elements when feasible not only reduces energy consumption associated with maintaining pressure across the membrane filtration elements but also prolongs the useful life span of the membranes themselves.

During the normal mode of operation, the membrane filter elements will output two streams of water. The primary output is water treated by the membrane filters which continues downstream to a suitable valve 146, a three-way diversion valve for example. The second output is the concentrate waste stream collected through conduit 180, which waste is collected for disposal/reprocessing or diverted back to the water source. Pressure sensors 218 and 226 are located respectively at the input and output of the membrane filter elements and provide inputs used by the controller 112 to calculate the differential pressure across the membrane filter elements 142a through 142g. When the differential pressure reaches a predetermined threshold, the controller 112 will activate a reverse flush process for the membrane filters. To accomplish the reverse flush process, the controller will activate the service pump 172, and configure the various valves, including valves 146, 148, 147a, 147b, 149a, 149b, 231 and 289, as appropriate, to supply clean water to the backside of the membrane filter elements 142a through 142g. Water used for the reverse flush process is then diverted through valve 181 to the waste stream conduit 182. When the frequency of reverse flush operations exceeds a predetermined threshold, the operator of the system may manually activate the clean in place ("CIP") process by manually switching the CIP valve 184a. The CIP process is similar to the reverse flush process with the addition of CIP chemicals and a soak cycle to allow the CIP chemicals to remain in contact with the filter membranes for a predetermined duration. The frequency at which the membrane filter reverse flush and/or cleaning occurs is selected to optimize the loss of treated water due to reverse flush and/or cleaning processes and the increased energy required to overcome the higher differential pressure which results as the membrane filter fouling progresses.

Large bacterial organisms can fall within the particle size range for which membrane filtration is effective, and any such bacteria present will be removed in the membrane filtration step. Filtration membranes used in the membrane filtration subsystem encompass membranes often referred to as microfiltration membranes as well as those referred to as ultra-filtration membranes, depending on membrane porosity, used singly or in combination. Preferably, the system may include ultra-filtration membranes, micro-filtration membranes, or both depending on the specific application. The use of membrane filtration, instead of the conventional sedimentation plus filtration treatment process, substantially reduces the volume of the filter media required, and thus reduces apparatus size and total space requirements for the treatment system.

Activated Carbon Filtration

Figure 4C:
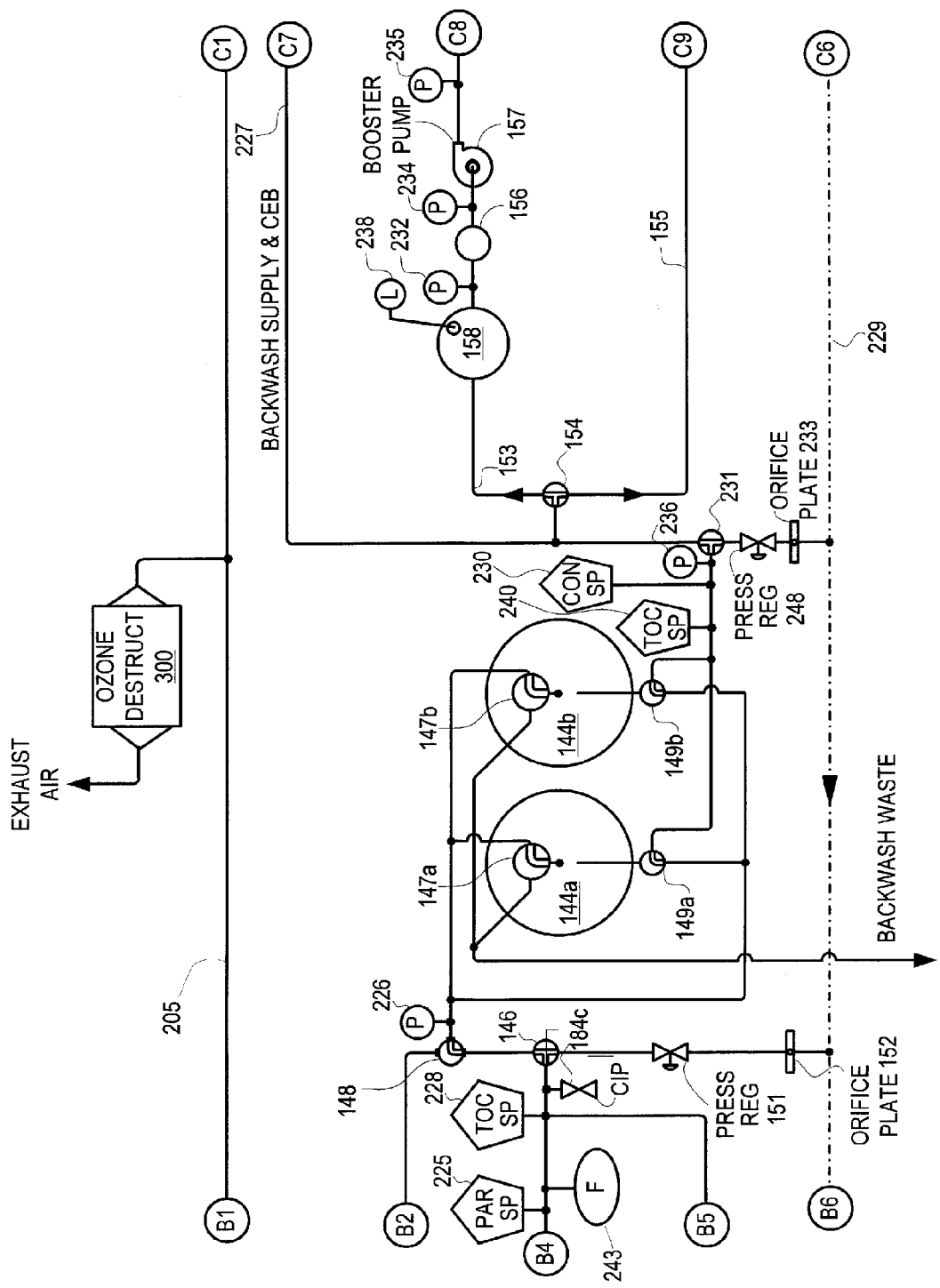
FIG. 4C is the third of a set of five related detailed schematic illustrations of an embodiment for a self-contained portable water treatment system.

As depicted in FIG. 4C, the activated carbon treatment subsystem may include a plurality of activated carbon filter elements, such as activated carbon elements 144a and 144b configured in a parallel configuration. Each element is typically a vessel containing granular-activated carbon. Activated carbon elements are located downstream of the membrane filter elements 142a-142g to protect the granular activated carbon from any gross contaminants removable by the membrane filter elements. This preserves the activated carbon filter elements 144a and 144b from unnecessary fouling and saves them for removing organic compounds and/or other dissolved chemical compounds such as pesticides, industrial solvents and lubricants remaining in the partially treated water. Activated carbon elements provide a barrier against the passage of these types of contaminants which are physically adsorbed by the granular activated carbon.

Water leaving, or bypassing, the membrane filter elements 142a-142g is monitored for total organic carbon content at a TOC sample point SP 228 (or monitored by a specific UV absorption meter and/or a spectroscopy meter) prior to the water entering the activated carbon filter elements 144a and 144b. If the TOC content of the water is above the programmed threshold value, the controller 112 signal activates suitable valves 147a and 147b to direct the total flow of partially treated water through the carbon filter elements. After treatment in the carbon filter elements, the partially treated wastewater may be directed through valves 149a and 149b back into the primary water flow path for potential further treatment downstream. If the TOC content is below a predetermined threshold the activated carbon filter elements are by-passed, again saving energy required to maintain pressure through the activated carbon filter elements and extending the period of time before the activated carbon must be replaced or regenerated. If salinity is not present and analytical methods have verified the absence of other regulated compounds in the partially treated water for which reverse osmosis would be needed, the activated carbon filter elements 144a and 144b can be used to "polish" out any compounds left after treatment by the membrane filter elements. The presence or lack of salinity is determined at conductivity sample point SP 230.

Grab sample analyses, which an operator would perform, can be used to verify the presence or absence of regulated compounds that do not impact conductivity and/or to verify the presence or absence of regulated compounds for which analytical sensor technology is not currently available. If the use of grab sample analysis is required, the controller 112 would demand that these sample inputs are entered into the control system at set intervals and if not performed, the water treatment system would fail safe and shutdown.

The membrane filter elements 142a-142g and the activated carbon filter elements 144a and 144b are located upstream of the reverse osmosis elements to protect the reserve osmosis filter membrane elements from excessive suspended materials and TOCs. This approach extends the useful life of the RO membranes and improves its filtration effectiveness.

Reverse Osmosis Filtration

Because the raw water supply may contain dissolved salts, in concentrations which may range from slightly brackish to the salinity of seawater, the system also includes a reverse osmosis subsystem. Reverse osmosis treatment elements operate under pressure so they have a fairly compact footprint and address the widest scope of contaminants, which are dissolved compounds. Under most uses, it is anticipated that reverse osmosis treatment elements will be used primarily to remove dissolved compounds from the partially treated water.

Figure 4D:
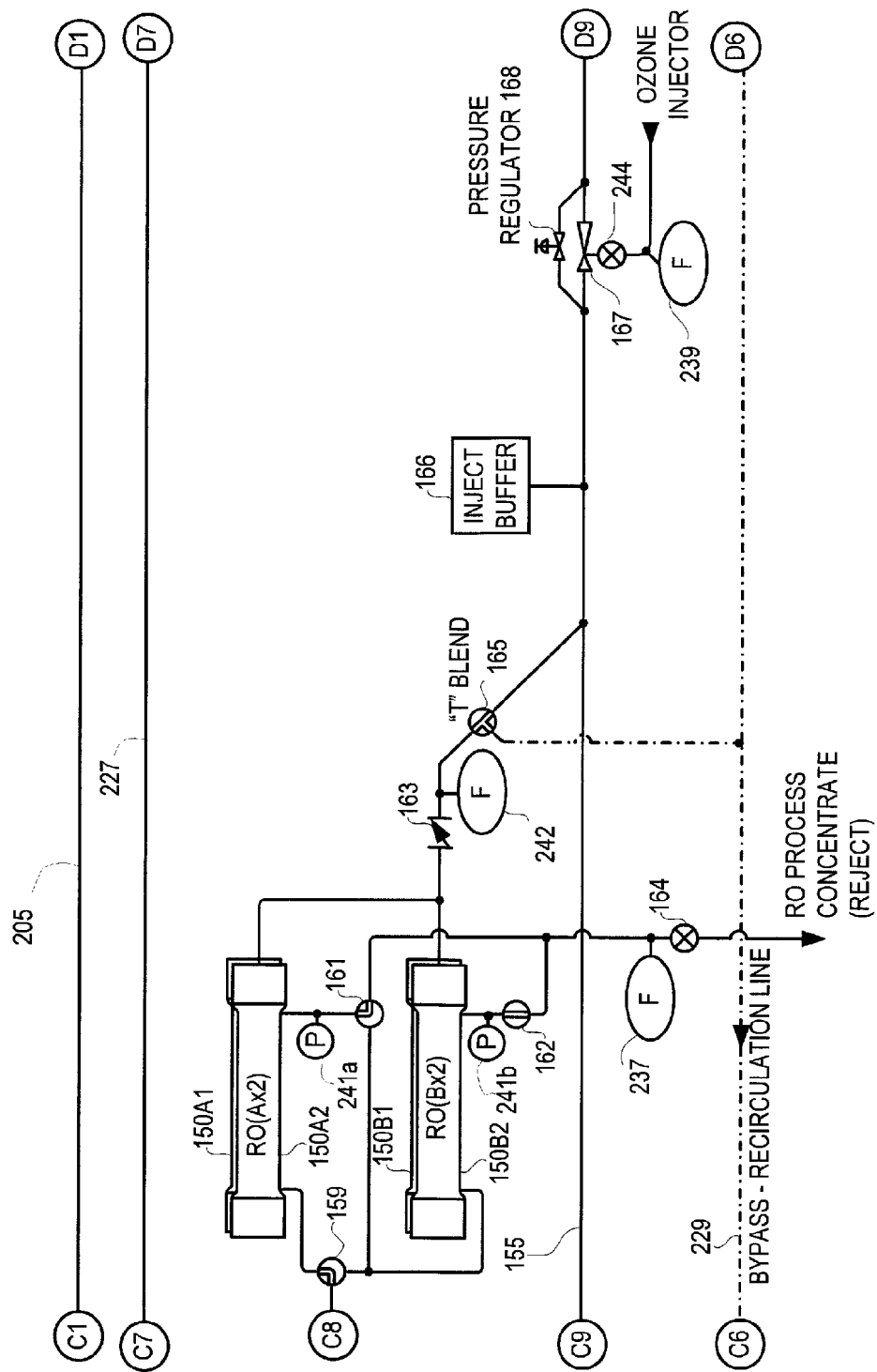
FIG. 4D is the fourth of a set of five related detailed schematic illustrations of an embodiment for a self-contained portable water treatment system.

As depicted in FIG. 4D, the reverse osmosis subsystem may include a plurality of reverse osmosis elements, such as for example elements 150A1 through 150B2. Each reverse osmosis element utilizes a semi-permeable membrane desalination approach. Preferably, the reverse osmosis subsystem includes two banks of reverse osmosis elements in series. Each bank includes a plurality of reverse osmosis elements in parallel. In FIG. 4D, a first bank comprises reverse osmosis elements 150A1 and 150A2, and reverse osmosis elements 150B1 and 150B2 comprise a second bank of reverse osmosis elements configured in series with the first bank of elements.

Water flowing from, or bypassing, the activated carbon filter elements 147a and 147b is tested for the presence of dissolved solids, including salts, in sufficient concentration to determine if the water upstream of the reserve osmosis banks require desalination. If a sufficiently high concentration is detected at conductivity sample point 230, the controller 112 provides a signal to direct activation of a suitable valve 154, a three-way ball valve for example, to route the partially treated water through conduit 153 to the reverse osmosis elements for removing the dissolved solids. If desalination is not required and it is confirmed that other chemical contaminates are not present in the partially treated water, the controller 112 may bypass the reverse osmosis subsystem by actuating valve 154 to direct the water through conduit 155, saving energy and prolonging the life of the reverse osmosis membranes.

To protect the reverse osmosis elements 150A1 through 150B2 from carbon fines in the water generated by the activated carbon filter elements 144a and 144b, a cartridge filter 156 may be located in the process flow upstream of the reverse osmosis elements 150A1 through 150B2. Pressure sensors 232 and 234 may be located across the cartridge filter 156 to monitor filter loading via signals to the controller 112.

When the controller 112 determines that treatment in the reverse osmosis subsystem is required, the controller 112 will utilize signals from pressure sensor 236 to determine if the flow stream pressure is sufficient for reverse osmosis operation. If the pressure is sufficient, booster pump 157 is not turned on. If the flow stream pressure is below the threshold level needed for reverse osmosis operation, the controller 112 will signal the booster pump 157 to operate at the required level to achieve the necessary water pressure upstream of the reverse osmosis elements. Prior to entering the booster pump 157, the partially treated water flows through a pressurized capillary buffer vessel 158 which decouples the water flow in the reverse osmosis element from the upstream treatment process flows. A level sensor 238 may be used to monitor the water level in buffer vessel 158.

Typically, a single pass through a reverse osmosis membrane will remove 98% of compounds over a molecular weight of 80. Depending on the specific chemicals present in the partially treated water and the level of treatment required, multiple passes through the reverse osmosis membrane may be necessary. The embodiment of the reverse osmosis elements depicted in FIG. 4D permits the reverse osmosis process t to be conducted via various modes of operation including, sequential application of the reverse osmosis membranes (low salinity) and single pass application of the reverse osmosis membranes (high salinity). The system may be readily modified to operate the reverse osmosis subsystem in other modes by adding additional valves and proposing steps to the system. The specific mode of operation and reverse osmosis membrane configuration selected will be based on the specific application, the desired operating pressure, the reverse osmosis elements selected, and/or the preference of the operator.

For raw water with low concentrations of salts, as when the raw water to be treated is brackish water from estuaries, the reverse osmosis subsystem can be set to operate in a sequential mode. In this scenario, the controller, based upon conductivity readings at SP 230 will control valves 154, 159 and 161 to direct the water first through the bank of elements 150A1 and 150A2 and then through valve 161 to the input of elements 150B1 and 150B2. The output of the treated water from the reverse osmosis elements 150A1, 150A2, 150B1 and 150B2 are then directed through a check valve 163 to the primary water flow conduit. If the treated water stills need treatment, the controller can adjust a suitable valve 165 to recirculate the treated water back through to the bypass-recirculation conduit 229 to the primary contact oxidation tank 130. The process concentrate or reject water removed from the banks of reverse osmosis elements flows may be directed through suitable valve 161 and/or 162 to a RO process concentrate conduit having a flow control valve 164 to control the flow rate of the concentrate. The conduit also has a flow meter 237 coupled therein to monitor the flow rate of the concentrate being rejected.

Alternatively, the controller can operate the reverse osmosis subsystem in a dilution process mode. Based on conductivity readings provided at SP 230 the controller can determine a percentage of partially treated water to send through the reverse osmosis element by adjusting valve 154 to direct the determined portion through the bank of elements 150A1 and 150A2 and then through valve 161 to the input of the bank of elements 150B1 and 150B2 while the remaining partially treated water will bypass the reverse osmosis process via conduit 155 and then recombine downstream of the reverse osmosis process to produce water with a safe salinity level. The dilution approach will only be utilized once it is determined that no toxic chemicals are in the partially treated water and the reverse osmosis elements are being used only to control salinity.

When dissolved compounds are high, as when the raw water to be treated is seawater, the reverse osmosis subsystem can be set to operate in a single pass mode. In this scenario, the controller, based upon conductivity readings at SP 230 will control valves 159 and 161 to alternately direct the water through the bank of elements 150A1 and 150A2 or then through the bank of elements 150B1 and 150B2. In other words, water is directed through only one bank of elements at a time. The output of the treated water from the reverse osmosis elements either 150A1, 150A2 or 150B1 and 150B2 is then directed through a check valve 163 to the primary water flow conduit. If the partially treated water stills need treatment, the controller can adjust the control valve 165 to recirculate the treated water back through the bypass-recirculation conduit 229 to the primary contact oxidation tank 130.

The process concentrate or reject water removed from the banks of reverse osmosis elements, either elements 150A1 and 150A2 or elements 150B1 and 150B2, flows through suitable valves 161 and/or 162 to the RO process concentrate conduit for discharge.

The multi-mode operation provided by the reverse osmosis subsystem allows a single membrane grade to successfully treat waters with a wide range of dissolved solids concentrations. An alternative to the multi-mode operation, which is considered within the embodiment of the invention, is to have replaceable reverse osmosis membranes. In this case, the specific reverse osmosis membranes can be selected based on the salinity of the raw water source. In addition to desalination, the reverse osmosis elements will also function to remove many chemical contaminants, organic chemicals (e.g., poisons, pesticides, pharmaceuticals), metals (e.g., mercury, arsenic, cadmium), and radioactive material that may remain in the partially treated water. When these types of chemical contaminates are present, all of the partially treated water leaving activated charcoal filtration will be processed through the reverse osmosis elements 150A1 through 150B2. The embodiment of the invention allows for the use of compound specific analytical instrumentation, which may vary depending on the specific application, to determine necessary process steps (e.g., need for reverse osmosis process). For situations where automated analytical sensors are not yet available, the invention allows for grab samples to be taken and test results to be manually entered into the controller 112. The invention also allows for the use of analytical instrumentation to measure or detect surrogates to infer the presence or absence of regulated compounds when determining process steps and/or finished water quality. If the use of grab sample analysis is required, the controller would demand that these sample inputs are entered into the control system at set intervals and if not performed, the water treatment system would fail safe and shutdown.

A disadvantage of using reverse osmosis is that reverse osmosis membranes pull out hardness ions/alkalinity constituents which decreases the pH of the partially treated water. After the water is treated in the reverse osmosis elements, the pH of the partially treated water is determined at SP 290 downstream of the final oxidation chamber 160. Based on this pH reading, the controller 112 may determine the appropriate amount of buffer chemical to inject at buffer injector 166 to adjust the pH to an acceptable level for human consumption.

Final Contract Oxidation/Ultraviolet Light Irradiation

After treatment in the reverse osmosis subsystem, virtually all contaminants have been removed from the treated water.

However, the partially treated water may still contain pathogenic organisms and a small trace of low molecular weight compounds that can be toxic, which were not removed or destroyed in upstream treatment elements. To address these contaminants, the system may include a final contact oxidation/UV element 160 that subjects the treated water to a final advanced oxidation/disinfection treatment process. A venturi 167 is coupled into the primary water flow conduit upstream of the element 160 and a pressure regulator 168 is in parallel with the venturi 167 so that the water entering the element 160 is maintained at a constant pressure but at a variable flow above a minimum flow. The controller may adjust the valve 244 to regulate the flow of the ozone into the venturi 167. A flow meter 239 measures the flow of the ozone into the ozone injector.

The final contact oxidation/UV element 160 is preferably a compartment or chamber positioned inside the service supply tank 170 that is in the shape of a vertical serpentine passageway having an inlet 172 through which upstream water from primary water flow conduit enters the vessel. The chamber 160 is fitted with an ozone injector (not shown) which the controller 112 can direct to inject sufficient ozone into the water as it enters the chamber 160 to begin the disinfection process. Due to its shape, the time that it takes the water to travels through the serpentine passageway to the outlet 174 is sufficient time for the water to be exposed to the ozone for the disinfection process to accomplish a final disinfection of the treated water. A higher level of ozone is injected into the final contact vessel than is required for disinfection which causes ozone to remain in concentration. As the treated water is about to exit contact chamber 160, it is irradiated with ultraviolet ("UV") light from an ultraviolet light source 176. The UV light hydrolyzes ozone to create OH hydroxyl radicals. The hydroxyl radicals breakdown the remaining contaminates, polishing the treated water and removing the ozone residual so no remaining ozone is in solution in the final treated water.

Water leaving the chamber 160 is directed into of the service tank 170 through conduit 175. The conduit 175 preferably includes various sampling points for monitoring and/or measuring various parameters. SP 290 is used to measure pH. SP 291 may be used to monitor UV radiation. SP 292 may be used to conduct a spectrographic analysis of the treated water using spectroscopy. SP 293 may be a SP for a turbidity sensor to measure turbidity. SP 294 may be used by an ozone sensor to measure any residual ozone concentration, and SP 295 may be used to measure conductivity to determine the residual dissolved solids concentration. If the tested conductivity and residual ozone parameter measurements are outside predetermined ranges, the level of ozone injection is automatically adjusted as needed to provide the final water quality specified.

The ozone used in the final contact chamber 160 is generated onsite by the ozone generator 134. The system 110 also includes an ozone destruct unit 300. Excess ozone from the primary contact tank 130 and the final contact chamber 160 may be vented through vent control valve 256 and conduit 205 to the destruct unit 300 where it will be decomposed into compounds safe for emitting into the atmosphere.

The water exiting the contact chamber 160 may be routed back to the service supply tank 170 by the controller through valve 177, where it is held for distribution or service use within the system. The treated water reaching the service tank (finished water) is free of impurities, and is clean and safe for human consumption and use. Water may be routed from the service water supply tank 170 through conduits 178 and 229 and valve 298 to the customer or user. Prior to the controller actuating the valve, the controller evaluates the residual dissolved ozone concentration of the finished water at SP 296 to insure that it is suitable for human consumption prior to routing it to the customer.

During the transient mode of operation, based upon the measure parameters taken at the various sample points, the controller may determine that the finished water does not meet the specifications for potable water or may determine that a steady state condition of the water quality of the finished water has not been reached. In such scenarios, the controller may activate valve 177 to direct finished water through valve 177 to the bypass-recirculation conduit 229 to the input to the primary oxidation tank 130.

In the backwashing mode the finished water stored in the service water supply tank may be used as a source of clean water for backwashing processes for the membrane filters, activated carbon filters, and reverse osmosis elements when needed. In the event the water is needed for such backwashing processes, the controller activates the service pump to direct the water stored in the service water storage tank 170 through conduit 299 and valve 289 for use in backwashing treatment processes.

Ozone and UV radiation are preferred treatment options for the final oxidation process because they require no consumables and only require logistics support for repair activities. The treatment capability of the system can be extended and expanded by injecting hydrogen peroxide into the water prior to its entry into the tank 170. This variation in, or alternative embodiment of the system is not contemplated to be necessary in most treatment applications, but it is to be understood that the inclusion of hydrogen peroxide injection apparatus and the injection step in which it is used is within the scope of the invention.

System Container

Figure 5:
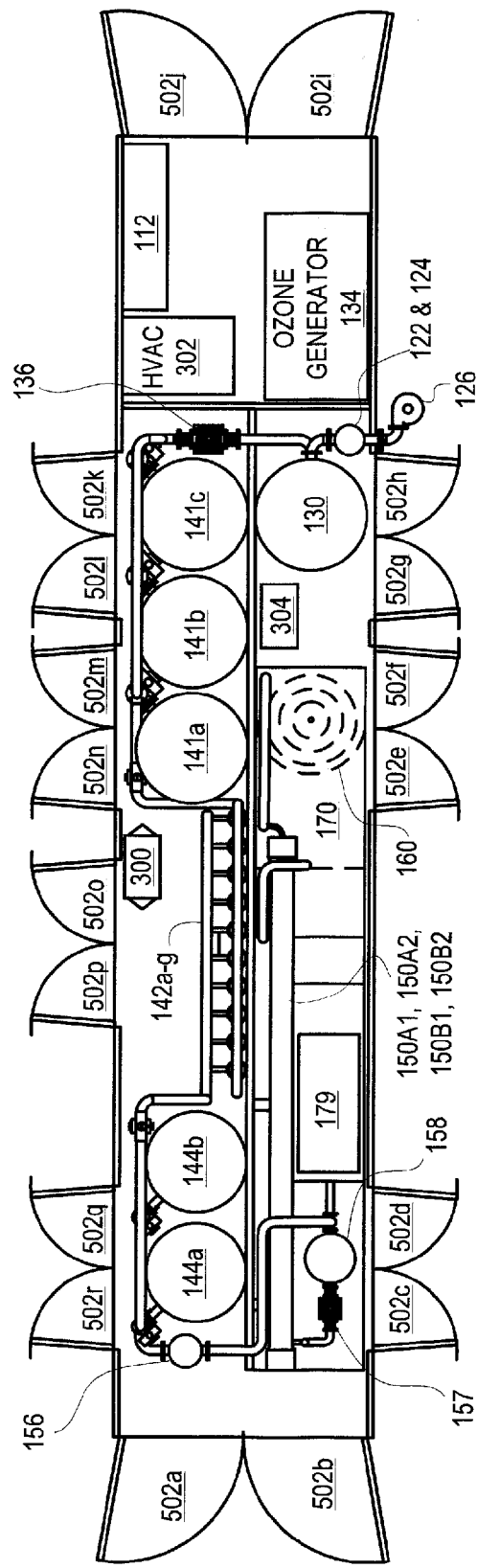
FIG. 5 is a top plan view of an embodiment for a self-contained portable water treatment system apparatus layout within the floor boundaries of a standard-sized international shipping container.

The apparatus described above for the system 110 is preferably laid out and connected in a highly compact arrangement for maximum portability. As depicted in FIG. 5, the embodiment of the water treatment system may be preferably packaged in such a manner as to be housed, shipped, and operated within a standard-sized shipping container 500 which serves as its support structure and protective environment. The shipping container 500 may be modified by adding access panels or doors such as doors 502*a* through 502*r*, strategically located in the container to allow access points for system operation, observation, maintenance, and repair. The container is also modified by adding supplemental diaphragm walls to increase the structural strength of the walls to compensate for the loss of structural strength resulting from the addition of the doors. The weight of the apparatus will be managed to allow for shipping to remote locations. Possible modes of transport include commercial truck, helicopter, and airdrop deployment.

It is contemplated that the system apparatus will be assembled at a fixed location, preferably within a standard-sized shipping container size. Enclosing the apparatus within such a shipping container not only protects the apparatus against the elements and other physical damage during transportation and set-up, but also provides security for the apparatus while in use at the treatment site. A suitable configuration layout of the equipment within a modified standard-sized shipping container is depicted in FIG. 5. The subsystems and elements of FIG. 5 corresponding to the same parts of FIG. 4A-4E are designated with like reference numerals. Preferably, the service water supply tank 170 may provide physical support for the reverse osmosis elements 150A1-150B2.

Operation in high temperature and high humidity conditions can be very destructive to electrical and electronic equipment and components, and it is contemplated that many sites where water treatment is needed will be in areas with harsh climates that experience extreme weather conditions, including but not limited to high heat and/or humidity levels. To protect the apparatus of the system and avoid interruptions in operation due to harsh climate or inclement weather, the container enclosure is provided with one or more cooling and dehumidifying units and an environmental control subsystem for controlling such units. As a means of avoiding heating of the interior of the container enclosure from the operation of, e.g., pumps and motors, heat generating equipment could, if desired or needed, be disposed outside the cooled and dehumidified volume of the container enclosure, or could be independently ventilated and/or cooled.

Methods of Operation

Figure 6A:
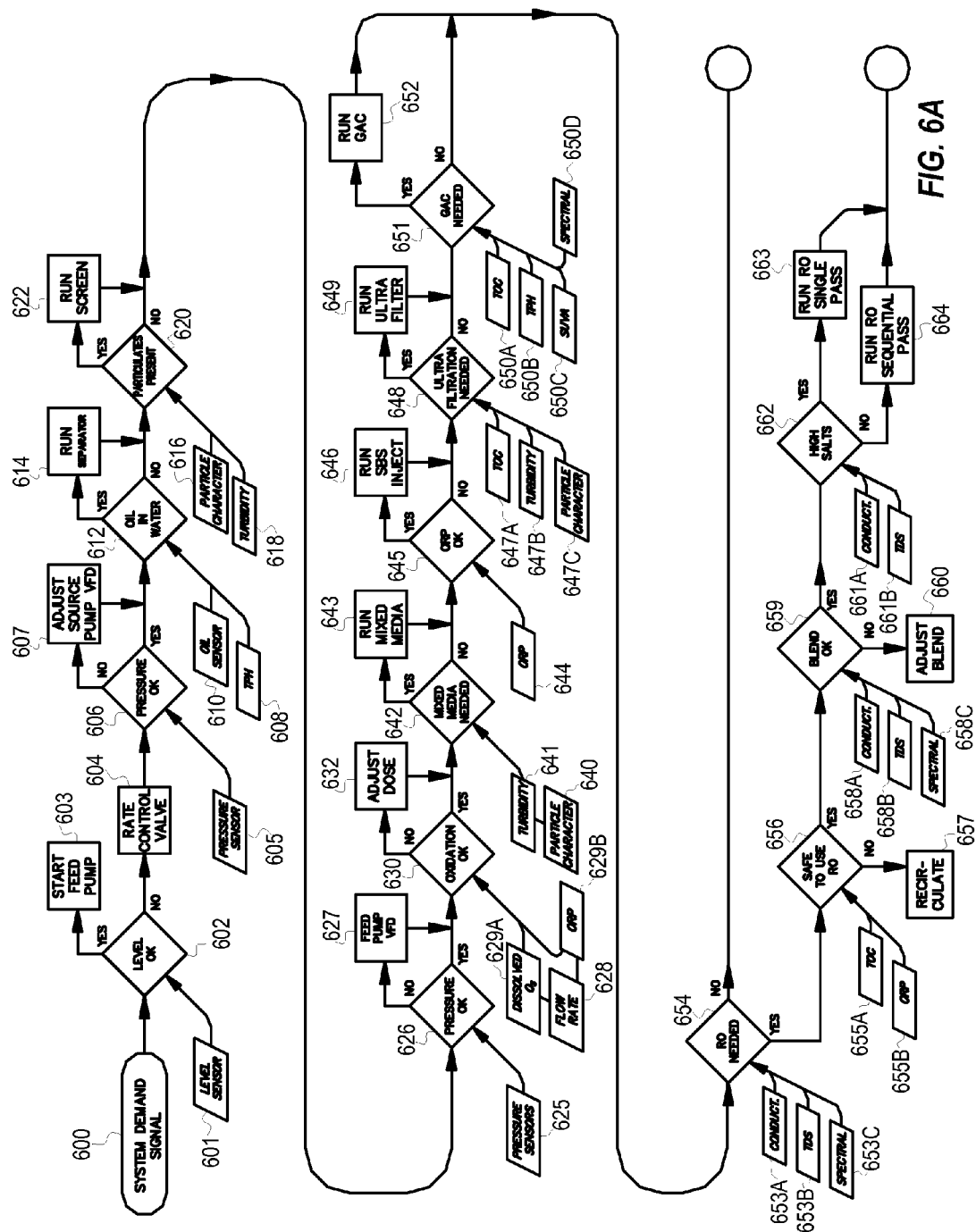
FIGS. 6A and 6B are decision diagrams for an embodiment of the sensor and control subsystems of the invention, showing sensor input and control output signals under various treatment processing conditions and sensor input data.
Figure 6B:
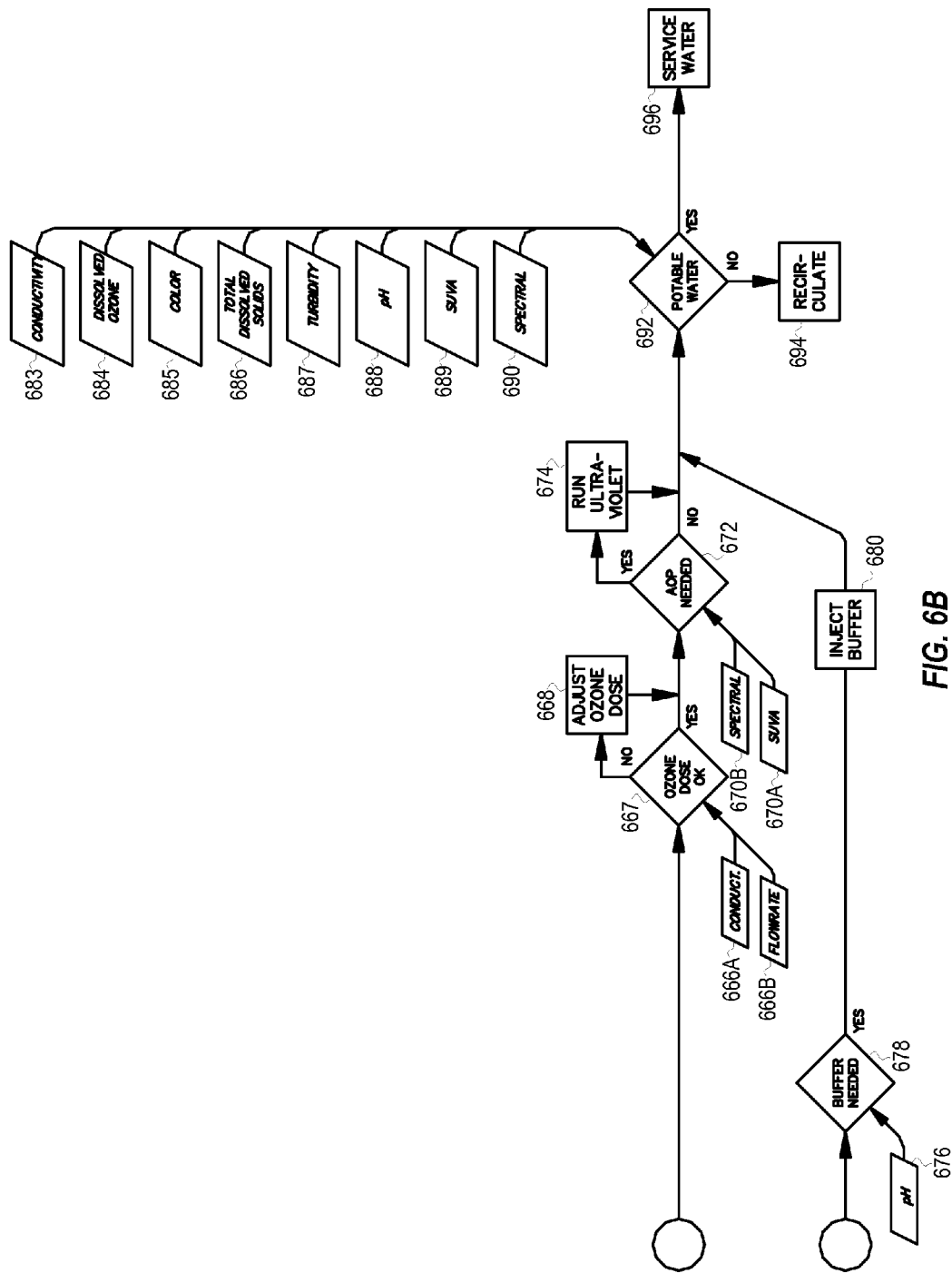

FIGS. 6A-6B are decision diagrams which depicts in more detail the process flow control logic describing the interaction and dependencies between the controller 110 and the various sensors and actuating means in the water treatment system, including a depiction of the sensor input and the controller output signals used for system 110 operation under various processing modes, conditions and sensor input data described in connection with the system 110 depicted in FIGS. 4A-4E.

Referring to FIG. 6A, in step 600 the controller initiates a system demand signal. Such a demand signal may occur when, e.g., the level in the clean water storage tank or service water supply tank 170 drops below a predetermined level. Another level sensor may be used to determine not only the level of treated water in the storage tank, but also to assure that the level of the water source is sufficient. In response to the system demand signal, the controller 112 in step 601 turns on the various sensors and monitors the input signals from the water level sensor 210 in the primary contact tank 130. In step 602 the controller determines if the water level in contact tank is acceptable to commence operations based upon the input signals from level sensor 210. If the level is acceptable, in step 603 the feed pump 136 is engaged. If the water level is not acceptable level, the controller in step 604 actuates the flow control valve 131 to route water into the primary contact tank 130 until the water level measured at level sensor 210 is sufficient.

In step 605, the controller next monitors the pressure at pressure sensor 209 to determine if the pressure upstream of the primary contact tank 130 is at an acceptable level. If the pressure is below an acceptable level, in step 606 the controller adjusts the output of source pump 126 until the pressure at pressure sensor 209 is at an acceptable level. In step 607, the pump adjusts its output. If the raw water is flowing into the system at an acceptable pressure, the controller continues to the next process step.

The controller next determines if there is oil present in the incoming water in step 608 in response to input signals from TPH sensor SP 202 or in step 610, from input signals from an oil sensor (not shown in FIG. 4A). In step 612, if oil is present and an oil-water separator is part of the system, the controller sends an output signal to actuate valve 125 to route water flow through the oil-water separator apparatus. In step 614, the oil-water separator removes the oil from the water. If the controller determines that oil is not present, the valve 125 is set to permit the water to bypass the oil-water separator.

In step 616, the controller next monitors the input signals from the particle sensor 208 or, in step 618, input signals from a turbidity sensor (not shown in FIG. 4A) to determine if the raw water includes particulates of a sufficient size to require straining If the controller determines that initial straining is required, in step 620 the controller actuates valve 121 to route the raw water to the particulate strainer 122 to remove the particulates. In step 622, the strainer removes the particulates. If the controller determines that initial straining is not required, in step it activates valve 121 so that the water bypasses the particulate strainer.

If a system demand signal is presented to the controller in step 600, he controller also references level sensor 210 in primary contact tank 130 to determine if the water level is adequate to engage feed pump 136. If the water level is adequate, the controller engages feed pump 136. If the water level is not adequate, the controller output signals to the pump 136 to pause until the water level in the tank is adequate.

In step 625, the controller references pressure sensor 214. In step 626, the controller determines if the pressure value from sensor 214 is not sufficient. In step 627, the controller outputs a signal to the feed pump 136 to direct it to adjust the pump's operation until the pressure reaches a predetermined level. If the pressure at sensor 214 is sufficient for operation, the pump's operation remain the same.

The controller then monitors the input signals, in step 628 from flow meter 211 and in step 629A from the dissolved ozone sensor SP 212. Alternatively, in step 629B the controller can monitor an ORP sensor (not shown) to determine if the partially treated water leaving the primary oxidation tank 130 contains dissolved ozone within a predetermined concentration range. In step 630, the controller determines if the dissolved ozone is within the predetermined range. If not, in step 632 the controller sends an output signal to the ozone injector 132 for the ozone detector to either increase or decrease the rate of ozone injection, as determined to be needed. If the dissolved ozone is within the predetermined range, the controller continues to the next process step.

The controller references, in step 641 the turbidity sensor 213 or in step 640 a particle sensor (not shown) to determine the turbidity of water, as the basis for a further determination of whether mixed media filtration is needed. In step 642, the controller determines if mixed media filtration is needed. If filtration is needed, in step 643, the controller activate automatic valves 141a through 141c to route the water through the mixed media filtration elements. If filtration is not needed, the controller actuates the valve 141a through 141c so that the filtration elements 141a through 141c are bypassed.

In step 644, the controller monitors the water leaving the mixed media filters for ORP at SP 220 for determining if the oxidation/reduction level of the water is within predetermined limits. In step 645, the controller determines if the oxidation/reduction potential is within limits. If not, in step 646 the controller outputs a signal to the SBS injector 223 directing it to add sodium bisulfate to the water to reduce the oxidation reduction potential level of the water. If the oxidation/reduction potential level is within predetermined limits, the controller moves to the next process step.

In step 647A, the controller monitors the water leaving or bypassing the mixed media filtration elements for TOC content through TOC sensor SP 224. In addition or in the alternative, in step 647B the controller may monitor the signals from a turbidity sensor SP (not shown) or in step 647C the signals from a particle sensor SP 222, all of which may be disposed in the water flow entering the membrane filtration elements. In step 648, the controller determines if membrane filtration is needed. If the TOC or other measured water quality parameter is above the programmed threshold value, the controller activates the valve 145 controlling the flow of water through or around the membrane filter elements 142a through 142g. In step 649, the membrane filter elements treat the incoming water. If the water quality is within the predetermined limits, the controller actuates valve 145 so that the water bypasses the membrane filter elements.

In step 650, the controller monitors the water leaving or bypassing the signals from the membrane filtration elements for one or more water quality parameters relating to turbidity, including TOC sensor SP in step 650A, TPH sensor SP in step 650B, SUVA meter SP in step 650C, or spectroscopy meter SP 650D, to determine if the water needs to be treated by the activated carbon filtration elements 144a and 144b. In step 651, the controller determines if the water should be treated in the activated carbon filtration elements. If yes, the controller in step 652 actuates valves 146, 147a, 147b, 149a and 149b to route the water through the activated carbon filtration elements for treatment. If the controller determines that the measure water quality parameter is suitably low the carbon filtration/adsorption treatment elements are bypassed.

In step 653, the controller monitors the water quality parameters of the water exiting or bypassing the activated carbon filtration elements from, in step 653 A the input signals from conductivity sensor SP 230, in step 653B the input signals from a total dissolved solids ("TDS") sensor (not shown), or in step 653C from a spectroscopy meter (not shown), which sensors tests for the presence of dissolved compounds in the water flowing from, or bypassing, the activated carbon filtration/adsorption elements. In step 654, the controller determine if reverse osmosis is required . . . . If the controller determines that reverse osmosis is not required, the control system actuates valve 154 so that the partially treated water bypasses the reverse osmosis elements.

In step 655, the controller monitors the water quality parameters of the water to determine if it safe to use the reverse osmosis elements by monitoring the input signals from, in step 655A, a TOC sensor SP 227 or in step 655B, an ORP sensor SP (not shown). In step 656, controller determines if it is safe to use the reverse osmosis elements. If it is not safe to use the reverse osmosis elements in step 657 it actuates valve 231 to route the water to a recirculation conduit 229 to recirculate the water. If the controller determines that it is safe, the controller advances to the next process step.

In step 658, the controller monitors the water quality parameters of the water by monitoring the input signals, in step 658A from a conductivity meter SP 230, in step 658B from a TDS sensor SP (not shown), or in step 658C from a spectroscopy meter SP (not shown). In step 659, the controller determines the portion of the water which needs to go through the reverse osmosis elements and the portion of the water that needs to bypass the reverse osmosis elements in order that the water quality of the recombined water stream downstream of the reverse osmosis elements will meet predetermined levels of dissolved compounds. In step 660, the controller adjusts the control valve 154 and pump 157 to allocate the water into a portion going through the reverse osmosis elements and a portion bypasses the elements.

In step 661, the controller monitors the water quality parameters of the water to determine the total dissolved solids of the water by monitoring input signals from, in step 661A from a conductivity sensor SP 230, or in step 661B from a TDS sensor SP (not shown). In step 662, the controller determines if the water is high salinity water. If it is, in step 663, the controller actuates valves at least 159 and 161 so that the water makes a single pass through the two banks of reverse osmosis elements 150A and 150B. If the water does not contain a high level of total dissolved solids, in step 664 the controller actuates valves 159 and 161 so that the water is sequentially treated by the two banks of reverse osmosis elements.

In step 666, the controller monitors the input signals, in step 666A from ORP sensor (not shown and, in step 666B ozone sensor (not shown) to determine the level of residual ozone in the partially treated water exiting the final contact oxidation chamber 160 following the treatment of the tested water with ozone to perform a final disinfection step. If the tested water quality parameters are outside predetermined ranges, in step 667, the controller outputs a signal to direct the ozone injector control valve 167 associated with the chamber 160 to adjust the level of ozone to be injected into the water during the final disinfection step. In step 668, the amount of ozone to be injected by the injector into the chamber 160 is adjusted. If the measured parameters are within predetermined ranges, the ozone injector continues to inject the same amount of ozone into the chamber 160t.

In step 676, the controller references the pH sensor SP 290 to determine if the pH of the water exiting the final contact chamber 160 is out of range. If the controller determines that the pH is out of range, in step 678 the controller directs the buffer injector 166 to inject a sufficient amount of buffer material to adjust the pH of the treated water. In step 680, the buffer injector injects the buffer material.

Depending, in part, upon the characteristics of the reverse osmosis membranes, the effectiveness of the activated carbon medium in removing all toxic organic compounds from the water, and, in further part, upon the treatment elements utilized in a particular treatment operation, there is a possibility that the water entering the final oxidation/disinfection chamber 160 may still contain organic chemicals that would prevent the finished water from meeting safety standards. In step 670, the controller may monitor in step 670A a SUVA meter SP or, in step 670B, a spectroscopy meter SP (not shown) to see if the toxic compound levels associated with organic chemicals are within the predetermined range In step 672, the controller will thereby determine if an advanced oxidation treatment process ("AOP") needs to be undertaken. If the spectral analysis and the SUVA output is not within predetermined ranges, the controller will output a signal to the ultraviolet lamp 176. In step 674, the ultraviolet lamp 176 will radiate the treated water to further disinfect the water and destroy any remaining ozone. If the spectral analysis and the SUVA output and both within predetermined ranges, the controller moves to the next process step.

Alternatively, the system may have a buffer injector to inject hydrogen peroxide prior to its entry into the final oxidation/disinfection chamber 160. The buffer injector then injects the hydrogen peroxide. This variation in or an alternative embodiment of the system is not contemplated to be necessary in most treatment applications, but it is to be understood that the inclusion of hydrogen peroxide injection apparatus and the injection step in which it is used is within the scope of the invention.

In steps 683-690, the controller may monitor input signals from a variety of other sensors and meters located on the outlet of the final contact oxidation vessel 160, such as for example conductivity sensor SP 295, dissolved ozone sensor SP 294, a color sensor, total dissolved solids sensor, turbidity sensor SP 293, ph meter SP 290, SUVA sensor SP 291, and spectroscopy meter SP 292 for a final analysis of the water quality of the treated finish water to determine if it is really potable water. If the controller determines that the measured parameters from the various sensors do not all fall within the predetermined ranges, in step 692, the controller outputs a signal to actuate valve 177 to recirculate the finish water back to the input of the primary oxidation tank 130. In step 694, the service pump redirects the water through the valve 177 to the recirculation conduit 229 back to the input of the primary oxidation tank 130. If the tested water is potable, in step 696 the control outputs a signal to activate valve 177 to store the water as service water in service water supply tank 170 or actuate valve 298 and engage pump 172 to directly send the water out to the user.

Startup and Other Transient Modes of Operation

The embodiment of the system apparatus will include an applications software application to program the controller 112 to perform a predetermined startup sequence. The purpose of the startup sequence is to ensure that the system 110 is started up safely, systematically, and in a process that allows confirmation that each major treatment subsystem and element is functioning properly and stabilized before additional treatment subsystems and elements are brought online. The startup sequence will also verify that the treated water is meeting the required water quality specifications for human consumption before it is allowed to enter the storage tank or be provided for end user consumption.

During startup the controller 112 will start the source pump 126 and configure the system to require all raw water be directed through the oil-water separator 124 and strainer particulate strainer 122 until a steady state condition is reached. Once a steady state condition is reached, the controller 112 and associated system sensors and instrumentation will determine whether these elements are still required based on the determinations made by the applications software run by the controller. At the same time, the controller 112 will configure primary contactor tank 130 and service pump 136 to recirculate the water in treatment through the primary contactor 130 and ozone injector control valve 133 until a predetermined level of dissolved ozone is established as measured by Sample Point (SP) 212. At this time the controller 112 will configure the system 110 to bring the mixed media filter elements 140a, 140b, and 140c online and add them to the existing recirculation loop for the water under treatment. When the turbidity of the water in treatment reaches a predetermined threshold, as measured at SP 213, the controller will configure the system to bring the membrane filter elements 142a through 142g online and continue growing the recirculation loop for the water under treatment. When the TOC level or comparable parameter of the water in treatment reaches a predetermined threshold, as measured at SP 228, the controller 112 will configure the system to bring the activated carbon filter elements 144a and 144b online therein adding them to the recirculation loop of the water under treatment. When the TOC level of the water in treatment reaches a predetermined threshold, as measured at SP 240, the controller will configure the system to bring the reverse osmosis elements 150A1 through 150B2 online by adding those elements to the recirculation loop. After the water exiting the reverse osmosis elements reaches a steady state condition, the controller 112 may then bring the final contact oxidation/UV vessel 160 online, including it in the recirculation loop. At this time, the entire system will be operating in a recirculation mode allowing the operator to confirm proper operation of all key elements. After this final stage reaches steady state and the treated water is confirmed safe for human consumption, the system 110 may exit the startup sequence and begin the normal mode of operation, supplying clean water for human consumption.

It should also be noted that the operator may also monitor all aspects of the operation of the system from a monitoring station and has the capability to provide user input to the controller. Accordingly, the controller also monitors for such user input, especially regarding the operators concerns about the potential presence of toxic compounds.

In the event the controller detects an upset condition in the system, the controller will cease operating the system in the transient mode and will return to a transient mode of operation.

Normal Mode of Operation

Figure 7A:
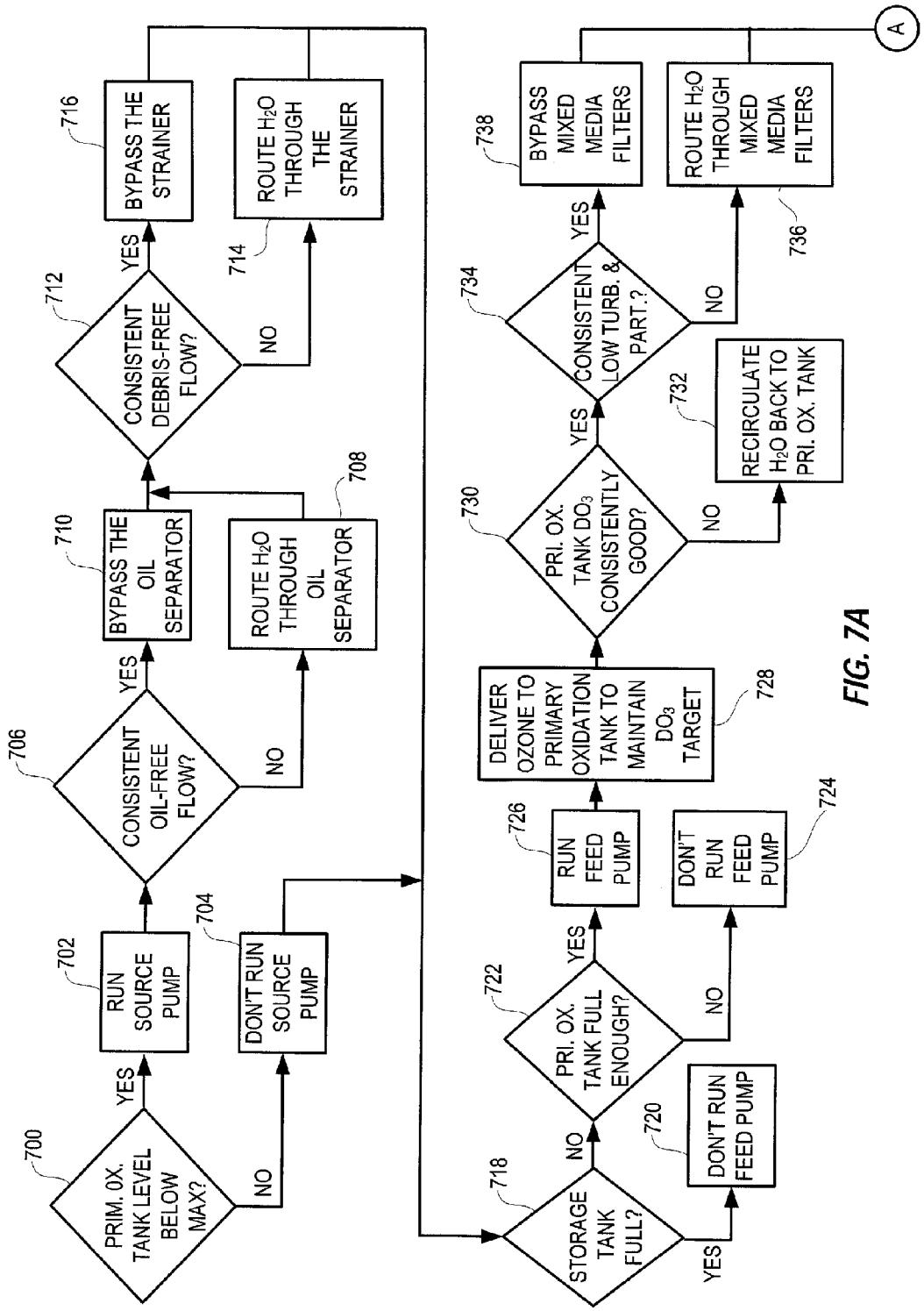
FIG. 7A is the first of a set of two flow diagrams illustrating an embodiment of a method of treating water in a self-contained portable water treatment system.
Figure 7B:
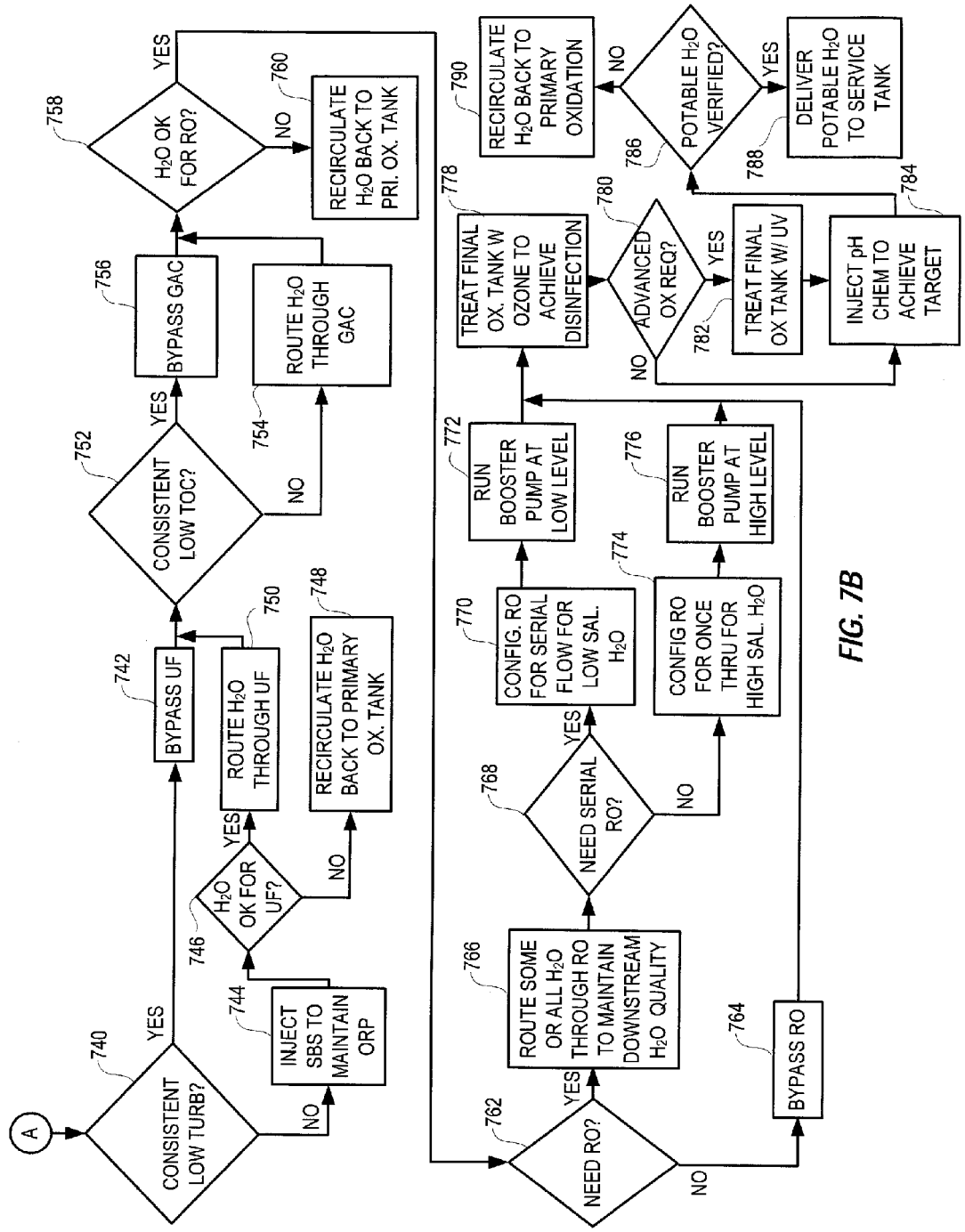
FIG. 7B is the second of a set of two flow diagrams illustrating an embodiment of a method of treating water in a self-contained portable water treatment system; and The foregoing summary as well as the following detailed description of the preferred embodiment of the invention will be better understood when read in conjunction with the appended drawings. It should be understood, however, that the invention is not limited to the precise arrangements and instrumentalities shown herein. The components in the drawings are not necessarily to scale, emphasis instead being placed upon clearly illustrating the principles of the present invention. Moreover, in the drawings, like reference numerals designate corresponding parts throughout the several views.

FIGS. 7A-7B are flow diagrams illustrating the method of operating the embodiment of the system 110 of FIGS. 4A through 4E in the normal mode of operation. As depicted in FIG. 7A, in step 700 the controller 112, based upon sensor input signals described in connection with the controller processes described in FIGS. 6A and B, determines if the primary oxidation tank water level is below the maximum. If the water level is low, the controller in step 702 output a signal to the source pump 126 to start pumping. If the water level is at a maximum, in step 704 the controller outputs a signal to the source pump not to operate and no additional source water is processed through the treatment subsystems.

In step 706, the controller determines if the water contains oil. If the water is not oil-free, in step 708 the controller outputs a signal to the valve 125 to direct the water flow to the oil-water separator and a signal to the oil water separator 124 so that it commences operating to remove the oil from the incoming source water. If the water is oil-free, the controller in step 710 activates the valve 125 so that the water bypasses the oil-water separator 124.

In step 712, the controller 112 determines whether the water contains particulates of a predetermined size that may interfere with the operation of the primary oxidation treatment tank. If the water does contain such particulates, in step 714, the controller actuates valve 121 to direct the water through the strainer 122 which strains the particulates exceeding a certain size, such as 100 microns for example, from the water. In the water does not contain such particulates, the controller in step 716 actuates the valve 121 so that the water bypasses the strainer 122.

In step 718, the controller determines if the service water supply tank 170 is full of water. If it is full, in step 720 the controller outputs a signal to the feed pump 136 to stop pumping. If it is not full, the controller, in step 722, the controller determines if the primary oxidation tank 130 is full. If the tank 130 is not full enough, the controller in step 724 outputs a signal to the feed pump 136 not to pump. If the primary oxidation tank 130 is full enough, the controller in step 726 output a signal to the feed pump to pump water from the tank 130.

In step 728, the controller outputs a signal to the ozone injector to inject ozone into the primary oxidation tank 130 to maintain the dissolved ozone concentration target needed to treat and disinfect the water in the tank. In step 730 the controller determines if the dissolved ozone level of the water exiting the primary oxidation tank 130 is consistently falls within the predetermined range. If it does not, in step 732, the controller outputs a signal to actuate valve 217b so that the water exiting the primary oxidation tank 130 is recirculated to the input of the tank. If the dissolved ozone level does falls within the predetermined range, the controller in step 734 determines if the turbidity and particle character falls within the predetermined range for acceptable water exiting the tank 130. If the water does not meet the turbidity and particle character requirements, in step 736, the controller outputs a signal to valves 141a, 141b, 141c, 143a, 143b, and 143c to route the water through the mixed media filter elements 140a, 140b, and 140c. If the water does meet the requirements, the controller in step 738 outputs a signal to valves 141a, 141b, 141c, 143a, 143b, 143c, 217a and 217b so that the water bypasses the mixed media filter elements.

In step 740, the controller next determines if the water upstream of the membrane filtration elements 142a through 142g consistently has sufficiently low turbidity levels and/or particle character. If the water does have sufficiently low turbidity levels and/or particle character, the controller in step 742 outputs signals to the valves 145, 146 and 148 so that the water bypasses the membrane elements 142a through 142g. If the water does not have sufficiently low turbidity levels and/or particle character, the controller in step 744 directs the SBS injector 223 to inject a sufficient amount of sodium bisulfite to maintain a suitable level. In step 746, the controller determines if the water meets a sufficient ORP level for the water to be treated in the membrane elements 142a through 142g. If the water does not meet the predetermined water quality criteria, the controller outputs a signal to valves 145, 146, and 148 so that the water is recirculated back to the primary oxidation tank 130. If the water does meet the particulate water quality criteria, the controller in step 750 outputs a signal to valve 145 to route the water through the membrane filtration elements for treatment.

In step 752, the controller determines if the partially treated water routed through the membrane filtration elements consistently has sufficiently low levels of TOC. If it does not, the controller in step 754 outputs a signal to valves 146, 147a, 147b, 148, 149a, and 149b so that the valves route the partially treated water through the granulated activated charcoal elements 144a and 144b. If the partially treated water does consistently meet the TOC water quality requirements, the controller in step 756 actuates the valves 146, 149a, 149b, and 148 so that the partially treated water bypasses the granulated activated charcoal elements. In step 758, the controller determines if the water quality parameters of the partially treated water is suitable for proccessing by the reverse osmosis elements 150A1 through 150B2. If the water does not meet the requirements, the controller in step 760 actuates valve 231 so that the water is recirculated back to the primary oxidation tank 130 for further treatment. If the partially treated water does meet the requirements, in step 762 the controller 112 determines if the water has sufficient levels of dissolved compounds that treatment of the water by the reverse osmosis elements would be helpful. If reverse osmosis treatment would not be helpful, the controller in step 764 actuates valves 154 and 231 so that the partially treated water bypasses the reverse osmosis treatment elements. If reverse osmosis treatment would be helpful, the controller in step 766 determines that some or all of the partially treated water should be routed through the reserve osmosis elements in order that predetermined downstream water quality level can be maintained and positions valve 154 and 231 to route either all or a predetermined portion of the water through the reverse osmosis subsystem. In step 768, the controller determines if the partially treated water has low or high salinity concentrations. If the water has low levels of dissolved compounds or conductivity, the controller in step 770 actuates valves 159 and 161 to route the partially treated water sequentially through the two banks 150A and 150B of reverse osmosis elements, respectively. The controller next in step 772 outputs a signal to the booster pump 157 to have it operate at a low head pressure level. If the water has high levels of dissolved compounds or conductivity, the controller in step 774 actuates valves 158 and 161 to route the water being treated alternately through one of the banks of the reverse osmosis elements to the output for a predetermined time period. In step 776, the controller outputs a signal to the booster pump 157 to have it operate at a higher head pressure level.

In step 778, the controller routes the partially treated water for treatment in the final oxidation chamber 160 with ozone being injected into the water by the ozone injector in order to achieve disinfection. In step 780, the controller next determines if advanced oxidation treatment is required. If it is required, the controller in step 782 directs the ultraviolet lamp to irradiate the ozone-treated water with UV light. In step 784, the controller determines the pH level of the water at SP 290 and then directs the buffer injector 166 to inject a buffer chemical into the water to achieve the targeted pH level for human consumption. In step 786, the controller receives sensor input signals from a variety of sensors at SPs, for example at SPs 291 through 295, that measure a variety of water quality parameters and uses these inputs to determine if the water quality of the finish treated water is potable water suitable for human consumption. If the controller determines that it is potable water, in step 788, the controller actuates valve 177 to deliver the potable water to the service water supply tank 170. If the controller determines that the water is not potable, the controller in step 790 actuates valve 177 to recirculate the water back to the primary oxidation tank 130 through recirculation conduit 229.

Backwashing Mode of Operation

As with all filtration elements or components, filter media will become loaded with contaminants filtered from the fluid flowing through the element, and will require replacement, or backwash to flush accumulated contaminant materials from the media and out of the filtration subsystem. Water used for backwash in the example of FIG. 4E is drawn from the service water supply tank 170 and is routed through the treatment element apparatus that is to be cleaned, in a path that may be essentially a reverse of the illustrated treatment flow path during normal operation. Backwash water, with entrained contaminant materials, can be returned to the raw water source, or otherwise appropriately disposed of The source for backwash water and the backwash flow paths are both subject to variation while remaining within the scope of the invention, and the paths shown in FIGS. 4A-4E are not to be taken as limiting. It will be understood that backwashable elements and components of the system 110 will not require backwash at the same time, due to factors such as uneven contaminant loading. The controller is designed and operated to be capable of establishing the most efficient and effective backwash flow path in differing loading circumstances, typically based upon pressure differentials detected by pressure sensor components.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:

1. A system for treating water, the system comprising:
a first oxidation subsystem;
a particulate filtration subsystem
a membrane filtration subsystem,
a second oxidation subsystem, the subsystems in fluid communication with each other in that order, the system including recirculation paths for each subsystem;

sensors for sensing water conditions in the system; and a controller in communication with the sensors and being configured to, responsive to the sensed conditions, determine in the order, which subsystems to bypass and whether to recirculate water from one of the subsystems to a previous subsystem in the order whereby a recirculation loop is configured, the controller being further configured to output a control signal in accordance therewith.

2. The system of claim 1 further comprising a rigid enclosure housing the subsystems and being suitable for shipping the system.

3. The system of claim 1 further comprising a source of ozone in fluid communication with the oxidation systems.

4. The system of claim 3 further comprising a backwash conduit in fluid communication with a location downstream of one of the oxidation subsystems.

5. The system of claim 1 wherein the second oxidation subsystem further comprises means for exposing the water to both ozone and ultraviolet light.

6. The system of claim 1 further comprising a screen filtration subsystem before the first oxidation subsystem in the order.

7. the system of claim 6 further comprising an oil/water separation subsystem before the screen filtration subsystem in the order.

8. The system of claim 7 further comprising a pump before the oil/water separation subsystem in the order.

9. The system of claim 1 further comprising an activated carbon filtration subsystem before the membrane filtration subsystem in the order.

10. The system of claim 1 further comprising a booster pump of the membrane filtration subsystem.

11. A method for treating water, the method comprising:

sensing water conditions in a water treatment system which includes a first oxidation subsystem, a particulate filtration subsystem, a membrane filtration subsystem, and a second oxidation subsystem, the subsystems in fluid communication with each other in that order, the system including recirculation paths for each subsystem;

responsive to the sensed conditions:

determining, in the order, which subsystems to bypass and determining whether to recirculate water from one of the subsystems to a previous subsystem in the order whereby a recirculation loop is configured; and bypassing systems and recirculating water in accordance therewith.

12. The method of claim 11 wherein the subsystems are housed in a rigid enclosure in their operational form and wherein the subsystems are suitable for shipping in their operational form.

13. The method of claim 11 further comprising dissolving ozone- containing gas in water in the oxidation subsystems.

14. The method of claim 13 further comprising backwashing with water from a location downstream of one of the oxidation subsystems.

15. The method of claim 11 further comprising exposing the water to both ozone and ultraviolet light in the second oxidation subsystem.

16. The method of claim 11 further comprising determining to pump water through the subsystems in the order.

17. The method of claim 11 further comprising determining to pump water through the membrane filtration subsystem.

18. A control system for a water treatment system, the control system comprising:

a controller configured to:

receive signals corresponding to sensed water conditions in a water treatment system which includes a first oxidation subsystem, a particulate filtration subsystem, a membrane filtration subsystem, and a second oxidation subsystem, the subsystems in fluid communication with one another in that order, the system including recirculation paths for each subsystem;

responsive to the sensed conditions:

determine, in the order, which subsystems to bypass and determine whether to recirculate water from one of the subsystems to a previous subsystem in the order whereby a recirculation loop is configured; and output a control signal in accordance therewith.

19. The control system of claim 18 wherein the controller is further configured to receive signals corresponding to initial sensed water conditions in the system and to initially configure the recirculation loop by adding, in the order and responsive to the initial sensed conditions, the subsystems to the recirculation loop.

20. The control system of claim 18 wherein the water treatment system further includes a source-water subsystem and the membrane filtration subsystem is a reverse osmosis subsystem and wherein the controller determines to recirculate water from the reverse osmosis subsystem to the source-water subsystem.

* * * * *